US005758417A

United States Patent [19]

Kobayashi et al.

[11] Patent Number: 5,758,417

[45] Date of Patent: Jun. 2, 1998

[54] METHOD OF MANUFACTURING AN INK JET HEAD HAVING A COATED SURFACE

[75] Inventors: Masatsune Kobayashi, Yokohama; Keiichi Murai, Kawasaki; Ryuichi Arai, Tokyo; Junichi Kobayashi, Ayase; Akihiko Shimomura; Akio Kashiwazaki, both of Yokohama, all of Japan

[73] Assignee: Canon Kabushiki Kaisha, Tokyo, Japan

[21] Appl. No.: 396,060

[22] Filed: Feb. 28, 1995

Related U.S. Application Data

[63] Continuation of Ser. No. 739,851, Aug. 2, 1991, abandoned.

[30] Foreign Application Priority Data

| | | | |
|---|---|---|---|
| Aug. 3, 1990 | [JP] | Japan | 2-205150 |
| Aug. 3, 1990 | [JP] | Japan | 2-205151 |
| Aug. 3, 1990 | [JP] | Japan | 2-205152 |
| Aug. 3, 1990 | [JP] | Japan | 2-205153 |
| Jul. 5, 1991 | [JP] | Japan | 3-165412 |
| Jul. 5, 1991 | [JP] | Japan | 3-165414 |

[51] Int. Cl.$^6$ .......... B29C 39/00; B41J 2/015; B41J 2/05; B23P 15/00

[52] U.S. Cl. .......... 29/890.1; 347/20; 347/63; 216/27

[58] Field of Search .......... 347/58, 59, 63, 347/65, 20; 156/629, 630.1, 633.1, 655.1, 668; 29/890.1; 216/27; 264/255, 259, 313, DIG. 44, DIG. 76, 272.11, 272.16, 268, 267, 266, 247, 246, 241

[56] References Cited

U.S. PATENT DOCUMENTS

| | | | |
|---|---|---|---|
| 4,417,251 | 11/1983 | Sugitani | 347/65 |
| 4,612,554 | 9/1986 | Poleshuk | 347/63 |
| 4,657,631 | 4/1987 | Noguchi | 216/27 |
| 4,775,445 | 10/1988 | Noguchi | 216/27 |
| 4,881,318 | 11/1989 | Komuro et al. | 347/58 X |
| 4,927,580 | 5/1990 | Nasu et al. | 264/255 X |
| 5,030,317 | 7/1991 | Noguchi | 216/27 |
| 5,049,231 | 9/1991 | Shibata | 216/27 |
| 5,126,768 | 6/1992 | Nozawa et al. | 347/65 |

FOREIGN PATENT DOCUMENTS

| | | |
|---|---|---|
| 60-032672 | 2/1985 | Japan . |
| 60-032673 | 2/1985 | Japan . |
| 61-015497 | 1/1986 | Japan . |
| 61-154947 | 7/1986 | Japan . |
| 62-025347 | 2/1987 | Japan . |
| 62-253457 | 11/1987 | Japan . |

OTHER PUBLICATIONS

Fréchet et al., "Thermally Depolymerizable Polycarbonates v. Acid Catalyzed Thermolysis of Allylic and Benzylic Polycarbonates: A New Route to Resist Imaging"; *Polymer Journal*, vol. 19, No. 1, 1987.

*Primary Examiner*—David F. Yockey
*Attorney, Agent, or Firm*—Fitzpatrick, Cella, Harper & Scinto

[57] ABSTRACT

An ink jet recording head is formed by forming a solid layer of removable material on a substrate to enable formation of flow paths and liquid chambers, coating a surface of the solid layer with a resin and removing the solid layer. The coating is performed by providing a mold, part of which is in contact with the solid layer, and coating the surface of the solid layer excluding at least a part of the surface. Further, bonding wires connecting the head to a circuit board are at least partly coated with the resin.

14 Claims, 19 Drawing Sheets

METHOD OF MANUFACTURING AN INK JET HEAD HAVING A COATED SURFACE

This application is a continuation of application Ser. No. 07/739,851 filed Aug. 2, 1991 now abandoned.

BACKGROUND OF THE INVENTION

1. Field of the Invention

The present invention relates to a method of forming a molded member on a substrate having elements preformed, and a mold used in the method, and particularly to a method of forming a molded member on a substrate, a mold for use with the method, and the molded member, in which the molded member having an undercut portion provided on an interface region with the substrate and an opening portion communicating to the undercut portion is fused with the substrate at the same time while being molded thereon with the transfer molding.

Also, the present invention relates to an ink jet recording head for recording onto a recording medium by discharging ink droplets through discharge ports, an ink jet recording apparatus with the head, and a manufacturing method of the head, wherein the ink jet recording head comprises the discharge ports through which the ink is discharged, a liquid chamber for reserving the ink which is supplied to the discharge ports, liquid channels for communicating the discharge ports to the liquid chamber, and energy generating elements for generating the energy with which the ink is discharged through the discharge ports.

2. Related Background Art

It is sometimes required to form a molded member having an undercut portion provided on an interface region with a substrate and an opening portion communicating with the undercut portion, on the substrate. One example is an ink jet recording head for recording by discharging ink droplets through minute discharge ports.

An ink jet recording head (hereafter referred to as "recording head") applied in an ink jet recording method is generally provided with one or more discharge ports for discharging the ink, a liquid chamber for storing the ink which is supplied to the discharge port(s), and one or more ink liquid channels communicating the discharge port(s) with the liquid chamber, and further at a location of the ink liquid channel is provided an energy generating element for generating the energy with which the ink is discharged. The ink within the ink liquid channel is discharged through the discharge port with the energy supplied by the energy generating element, with the ink decreased by the discharge being supplied from the liquid chamber into the ink liquid channel. Also, the ink is supplied through a supply port into the liquid chamber.

The following methods of manufacturing a conventional recording head are known, for example.

(1) A method of using a first substrate provided with the energy generating element and a second substrate made of glass or metal, and after providing on the second substrate the discharge port, a recess portion for forming the liquid channel and the liquid chamber, and the supply port for communicating the liquid chamber to the outside, with processing means such as cutting or etching, pasting the second substrate onto the first substrate with an adhesive in registration of the energy generating element with the liquid channel.

(2) A method in which the solid layer of a pattern corresponding to the discharge port, the liquid channel and the liquid chamber is provided on the first substrate by pasting a positive or negative type photosensitive dry film on a substrate of glass or the like provided with the energy generating element, and exposing and developing the photosensitive dry film, with or without a mask, using photolithography. Next, a liquid curable material mixed with a curing agent is applied on the solid layer and the substrate, in an appropriate thickness, and cured by leaving it at a predetermined temperature for a long time. Then, the substrate is cut off at the position where the discharge port is formed, to expose an end face of the solid layer, and then immersed into a solution which can dissolve the solid layer, so that a space forming the liquid channel and the liquid chamber is provided inside by dissolving and removing the solid layer from the substrate having the curable material cured (see Japanese Laid-Open Patent Application No. 61-15497).

(3) A method in which the solid layer with a pattern corresponding to the discharge port, the liquid channel and a part of the liquid chamber is provided on a first substrate, by pasting a photosensitive dry film on the first substrate provided with the energy generating element, and exposing and developing the photosensitive dry film, and thus the pattern corresponding to the discharge port, the liquid channel and a part of the liquid chamber, with or without a mask. On the solid layer and the first substrate, an activation energy line curable material, which is curable with the activation energy line such as ultraviolet or electron ray, is applied in an appropriate thickness. A laminate is formed by preparing a second substrate provided with a recess forming the other part of the liquid chamber and a supply port and transmitting the activation energy line, and pasting the second substrate on the activation energy line curable material so that the recess of the second substrate may be aligned with the position where the liquid chamber is to be formed. Next, the second substrate is masked to hide a portion where the liquid chamber is to be formed, the activation energy line curable material is radiated and cured through the second substrate with the activation energy line, and then the laminate is cut out at the position where the discharge port is formed, to expose an end face of the solid layer, so that a space forming the liquid channel and the liquid chamber is provided inside by dissolving and removing the solid layer and uncured activation energy line curable material from the laminate (see Japanese Laid-Open Patent Application No. 62-25347).

When a molded member as above explained with the instance of the ink jet recording head is fabricated, in the manufacturing method of (1), it is possible to fabricate the member having a large liquid chamber suitable for the high-speed recording, by enlarging the recess portion for forming the liquid chamber provided on the second substrate, but it is necessary to bond both substrates in precise registration between a minute energy generating element on the first substrate and a minute liquid channel on the second substrate, resulting in a disadvantage that the apparatus becomes complex and expensive, lacking in the capability of mass production and causing a cost increase of the apparatus (with a difficulty in attaining the positional accuracy in pasting). In the manufacturing method of (2), such a precise registration as in (1) is not necessary, but the volume of the liquid chamber is restricted by the thickness of pattern-like solid layer, so that a very large liquid chamber can not be fabricated, and the process is complex and time-consuming, with a lot of processes, resulting in a problem of lacking in the capability of mass production and causing a cost increase of product. In the manufacturing method of (3), the liquid chamber can be made larger by enlarging the recess portion for forming other part of the liquid chamber, and the precise registration is unnecessary, but the process is complex and time-consuming as in the manufacturing method of (2), and there are further more processes, resulting in a problem of lacking in the capability of mass production and causing a cost increase of product, which is sought to be resolved.

As to a general molded member, it is difficult to enhance the positional accuracy of pasting in the method of pasting a preformed molded member with the substrate, for example, in an ink jet recording head, it can happen that the liquid channel on the molded member side and the energy generating element on the substrate are not correctly aligned with each other. Further, there is a problem of causing such a failure that the exfoliation may occur because the strength of a pasted portion is not sufficient, or an adhesive may flow into the undercut portion to block it, which is sought to be resolved. On the other hand, in the method of forming a molded member on the substrate in several steps, there is a problem that the number of such steps is increased, and it is difficult to maintain the mechanical strength because the process is divided into several steps. Further, in either method above, there is a problem that the capability of mass production is inferior because of it being unsuitable for fabrication of many products at a time, which is sought to be resolved.

Also, a conventional electrical wiring to the ink jet recording head was made in such a manner as to provide an electrode to discharge energy generating means on a portion of the substrate where the ultraviolet curing resin is kept from being laminated, and connect the electrode with an electrical connection member such as a print substrate, using the electrical mounting technique such as a wire bonding, after forming an ink jet recording head main body.

Or the ink jet recording head can be also fabricated by preparing a grooved ceiling plate formed integrally with the liquid chamber and the liquid channel, and bonding it with a substrate having discharge energy generating means arranged. Also in this case, the electrical wiring to the ink jet recording head was made by connecting an electrode on the substrate with the electrical connecting member, using the wire bonding or the like, as above described, after assembling an ink jet recording head main body.

As in the conventional ink jet recording head as above described, the connection to the electrical connecting member is made after forming and assembling the ink jet recording head main body, the capability of mass production is lower, and the evaluation of electrical characteristics can not be made unless the ink jet recording head has been completed, thereby causing a difficulty in detecting a failure at early times. And there is such a problem that the electrode provided on the substrate for supplying the electric power to discharge energy generating means may be subjected to oxidation and corrosion, or damaged, during a process of forming and assembling the main body of ink jet recording head, so that some care must be taken in maintaining the reliability of connection with the electrical connecting member, therefore increasing the number of processes, which is sought to be resolved.

SUMMARY OF THE INVENTION

The present invention was achieved to resolve the above-described problems in connection with the relevant techniques, and an object of the present invention is to provide a method of forming on a substrate a molded member having an undercut portion provided at an interface region with the substrate where elements are preformed and an opening portion communicating to the undercut portion, wherein the positional accuracy is high, the mechanical strength is sufficient, the number of processes is small and the capability of mass production is superior. Also, it is an object of the present invention to provide the mold useful in this forming method.

Also, another object of the present invention is to provide a cheap ink jet recording head capable of forming a larger liquid chamber in simpler and fewer processes and suitable for the mass production and inexpensive, without the needs for a process of pasting two substrates in precise registration, an ink jet recording apparatus having the ink jet recording head, and a manufacturing method of the ink jet recording head.

A further object of the invention is to provide an ink jet recording head which is in high quality, precise, inexpensive, and high in the capability of mass production, its manufacturing method, and an ink jet recording apparatus using the ink jet recording head. Particularly, it is to provide an ink jet recording head having a highly reliable connection with the electrical connecting member and capable of detecting a failure at early times by allowing the early evaluation of electrical characteristics, its manufacturing method, and an ink jet recording apparatus using the ink jet recording head.

Also, another object of the invention is to provide a precise and reliable molded member ink jet head, and its manufacturing method, by finding an excellent condition for a solid layer serving as a mold of the liquid channel and the liquid chamber which is an undercut portion, and a molding material.

Further, an object is to provide a manufacturing method of obtaining a precise undercut portion into which matter such as bubbles may not enter by defining a flow direction of molding material at the molding, and a molded member ink jet head and an apparatus which are fabricated with such method.

The manufacturing method according to the present invention is one in which a solid layer made of a removable material at the position corresponding to at least an undercut portion on a substrate is formed, a molded member is fused onto the substrate having the solid layer formed, at the same time while being molded with the transfer molding, and thereafter, the solid layer is removed, so that the positioning accuracy on the undercut portion is as high as that on the formation of the solid layer, the mechanical strength of product is sufficient, and there are fewer number of processes.

Also, when the undercut portion extends in one direction, two molded members opposed are integrally fused onto the substrate while at the same time being molded therein, thereby reducing the amount of work per one product.

Also, if at least a face of one mold in contact with the substrate is made up of a soft material, an even pressure is applied on the substrate at the molding, thereby preventing a bad effect on the elements on the substrate.

In an ink jet recording head according to the present invention, a space surrounded by a groove portion formed in a face of a structural member opposed to a substrate and an element face of the substrate constitutes the liquid channel, and an opening out of this space constitutes the discharge port. A cavity portion communicating to the ink channel and having the element face as a bottom wall constitutes the liquid chamber, with the opening of cavity portion serving as a supply port.

Also, a solid layer made of a removable material is formed at the position where at least the liquid channel is formed on a substrate, a structural member is fused onto the substrate, while at the same time being molded, with the transfer molding, and thereafter, the solid layer is removed, so that the positioning accuracy of the liquid channel with respect to the substrate is as high as that of the solid layer with respect to the substrate, the adhesion strength of the structural member with the substrate is sufficient, and there are fewer number of processes. Also, as a face of one mold holding the substrate and in contact with the substrate is made up of a soft material, the force applied on the substrate at the molding becomes uniform, so that the fracture of the substrate or breakage of the energy generating element on the substrate can be prevented.

If the structural member corresponding to two ink jet recording heads opposingly arranged is formed integrally on the substrate, and then cut off, the amount of work per one product can be reduced. Also, if the discharge port is formed by the cutoff, the shape precision of the discharge port becomes higher.

Further, in a manufacturing method of an ink jet recording head according to the present invention, a part of the solid layer corresponding to the liquid channel is formed in registration with the energy generating element of the substrate. The structural member for forming the discharge port, the liquid channel and the liquid chamber are fused onto one face of the substrate where the solid layer is formed, while at the same time being molded, with the transfer molding.

The solid layer is removed from a surface not covered by the structural member, or its surface and a cut off and exposed surface, so that a space making up the discharge port and the liquid channel is created on a surface of the structural member opposed to the substrate, and a cavity portion, i.e., the liquid chamber, is created having the element surface of the substrate communicating to the space as a bottom wall.

The electrical connecting portion between the electrical connecting member and the electrode is formed in a relatively early process of manufacturing the ink jet recording head, to be placed in a state of being included within a liquid channel constituting member, so that the surface of the electrode or electrical connecting member is not subject to corrosion or damage, and the evaluation of electrical characteristics can be made at early times. And the solid layer made of a removable material is formed on a portion corresponding to the liquid channel on the substrate, and then the liquid channel constituting member is formed on the substrate, so that the positioning accuracy of the liquid channel with respect to the substrate is higher.

BRIEF DESCRIPTION OF THE DRAWINGS

FIGS. 4A–4F are views for explaining one example of the manufacturing method of an ink jet recording head, wherein FIG. 4A is a typical perspective view showing a substrate, FIG. 4B is a typical perspective view showing the substrate provided with a solid layer, FIG. 4C is a cross-sectional view of essential parts for a mold useful in molding a structural member, FIG. 4D is a typical plan view showing the structural member after releasing the mold, FIG. 4E is a cross-sectional view taken along the line E—E of FIG. 4D, and FIG. 4F is a cross-sectional view taken along the line E—E of FIG. 4D after removing the solid layer, FIGS. 5A–5D are views for explaining another example of the manufacturing method of an ink jet recording head, wherein FIG. 5A is a typical perspective view showing a substrate, FIG. 5B is a typical perspective view showing the substrate provided with a solid layer, FIG. 5C is a cross-sectional view of essential parts for a mold useful in molding a structural member, and FIG. 5D is a cross-sectional view of essential parts for a mold useful in molding the structural member after releasing the mold.

FIGS. 6A–6B are views for explaining another example of the manufacturing method of an ink jet recording head, wherein FIG. 6A is a plan view thereof, and FIG. 6B is a cross-sectional view cut off at the discharge port forming position of A.

FIGS. 13A–13B are views showing one example of a mold useful in the manufacture of a recording head, wherein FIG. 13A is a longitudinal cross-sectional view, and FIG. 13B is a cross-sectional view taken along the line B—B in FIG. 13A.

FIGS. 22A–22B are views showing the manufacturing process for the multi-impression, wherein FIG. 22A is a view showing the flow, and FIG. 22B is a cross-sectional view taken along the line B—B in FIG. 22A.

DETAILED DESCRIPTION OF THE PREFERRED EMBODIMENT

The examples of the present invention will be described below based on the drawings in connection with the ink jet head.

First, a first example of an ink jet recording head (hereinafter referred to as "recording head") fabricated with a manufacturing method of the ink jet recording head according to the present invention will be described.

Figure 1:
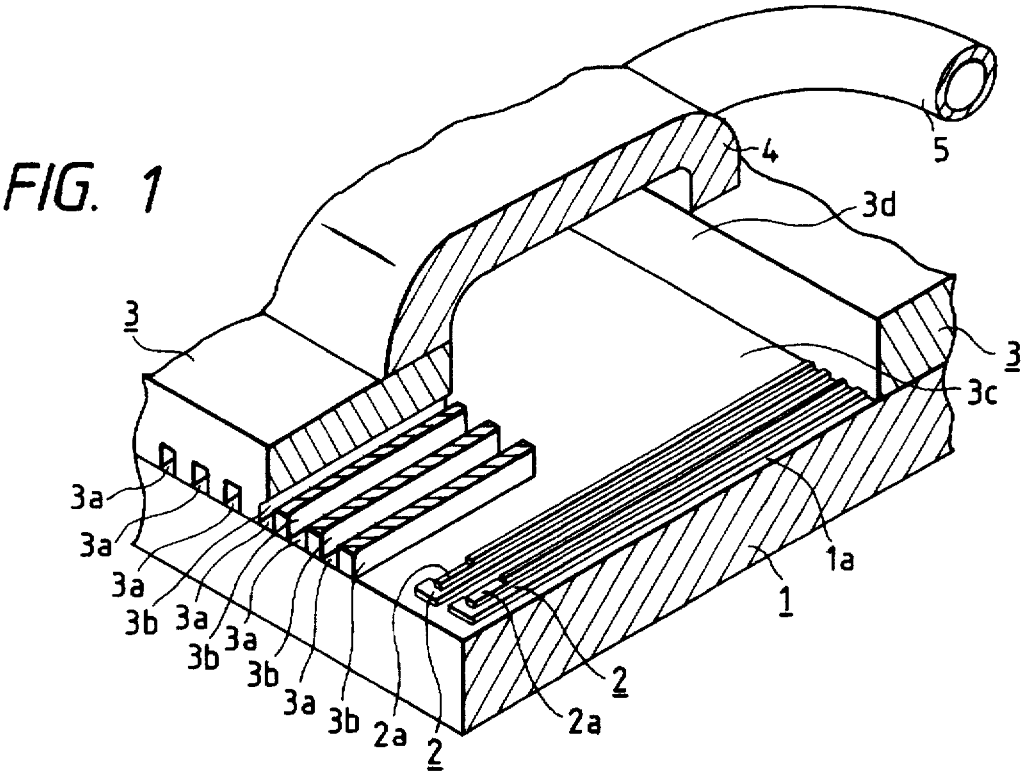
FIG. 1 is a perspective view, partially broken away, showing one example of an ink jet recording head.

FIG. 1 is a perspective view, partially broken away, showing the constitution of the recording head. In the same figure, a plurality of electrodes 2 having electricity-heat converters 2*a* (e.g., $HfB_2$+Al+$SiO_2$+Ta) are formed as the film, with a semiconductor manufacturing process, such as etching, vapor deposition or sputtering, and arranged at predetermined spacings on one surface of a substrate 1 made of glass, semiconductor (silicon wafer), ceramic, plastic or metal, this one surface being an element surface 1*a*. Also, on the element surface 1*a*, a structural member 3 of one piece made of a thermosetting resin such as epoxy resin or silicon resin is fused therein while at the same time being molded, with the transfer molding.

On a face of the structural member 3 opposed to the element surface 1*a*, a plurality of groove portions are formed corresponding to positions of electricity-heat converters 2*a*, respectively, with a space surrounded by each groove portion and the element surface 1*a* constituting a liquid channel 3*b*, and an opening out of each space constituting a discharge port 3*a*. Also, the structural member 3 is formed with a cavity portion communicating with each groove portion (liquid channel 3*b*) and having the element surface 1*a* as a bottom wall, thereby constituting a liquid chamber 3*c*, and moreover, an opening for communicating the cavity portion (liquid chamber 3*c*) to the outside (such as a connector 4 as described thereafter) is formed in the same direction as that in which the element surface 1*a* faces to provide a supply port 3*d*. The supply port 3*d* is connected via the connector 4 with a supply tube 5 connected to an ink tank, not shown, the ink being supplied from the ink tank through the supply tube 3*d* to the liquid chamber 3*c*.

Here, the operation in discharging the ink through each discharge port 3*a* will be described. The ink supplied to the liquid chamber 3*c* is entered into the liquid channel 3*b* with a capillary action, forming a meniscus at the discharge port 3*a* and keeping the liquid channel 3*b* filled. Then, the electricity-heat converter 2*a* is energized via the electrode 2 and heated, causing the ink on the electricity-heat converter 2*a* to be rapidly heated and produce bubbles within the liquid channel 3*b*, so that the ink is discharged through the discharge port 3*a* with the expansion of bubbles.

Though an example of the energy generating element for generating the energy for discharging the ink was shown by providing the electricity-heat converter 2*a* in the electrode 2, the invention is not limited to such a form, but a piezoelectric element for generating the mechanical energy acting to instantly apply the discharge pressure onto the ink can be used. Also, the discharge port 3*a* can be formed at a high density of 16 ports/mm, in 128 or 256 ports, and further can be made the full-line type by forming them across the entire width of a recording area of a recording medium.

Figure 2:
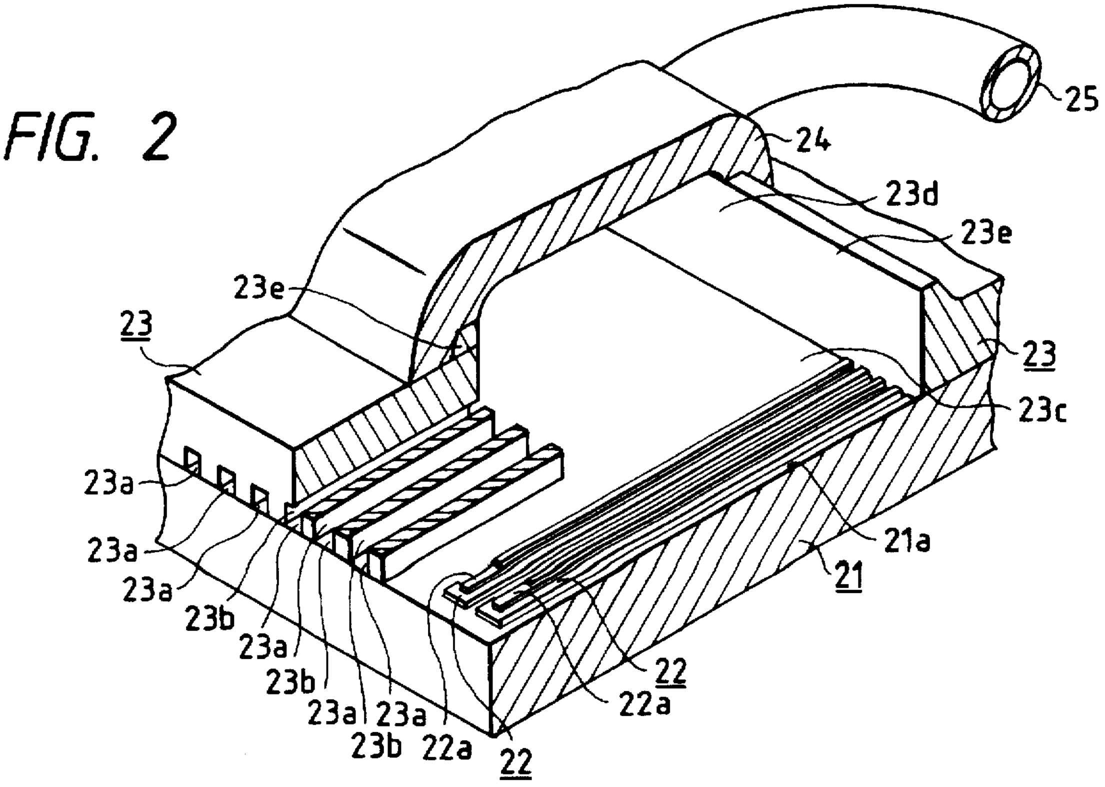
FIG. 2 is a perspective view, partially broken away, showing another example of an ink jet recording head.

Next, another example of a recording head will be described below. The recording head of this example has a protruding portion 23*e* protruding away from the substrate formed integrally with a structural member 23 at the peripheral portion of an opening end on the external side (on the side of a connector 24) of a supply port 23*d* which is an opening for communicating a cavity portion (liquid chamber 23*c*) to the outside, as shown in FIG. 2. Other points are the same as in the first example of recording head, and the explanation will be omitted.

The protruding portion 23*e* can serve to fulfill the positioning function in connecting the connector 24 to the supply port 23*d*, and when bonding with an adhesive, the bonded surface can be larger, thereby making the bonding stronger.

Figure 3:
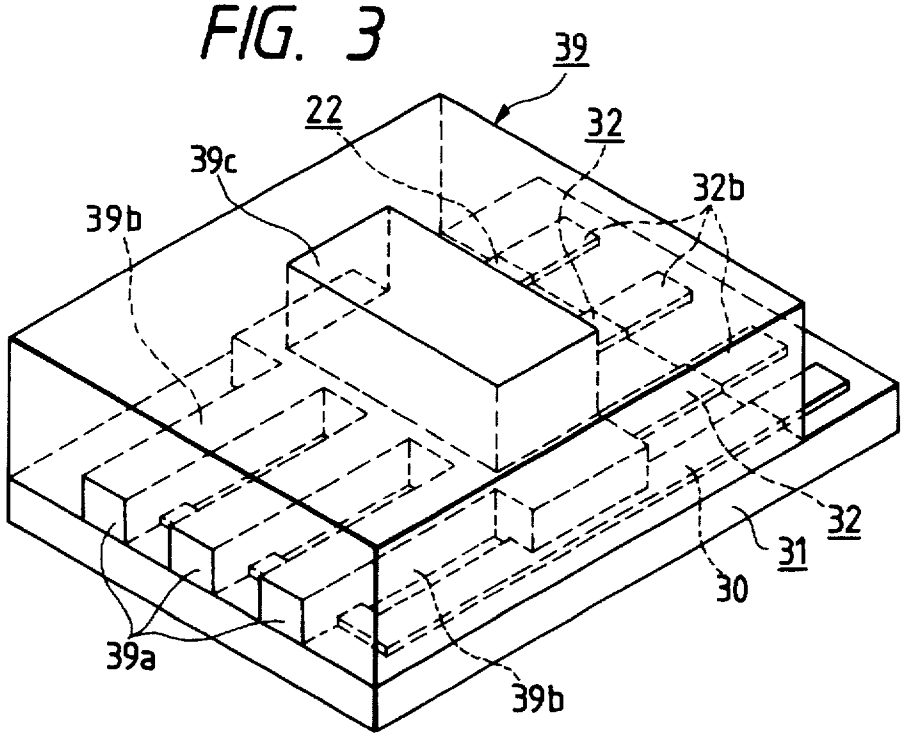
FIG. 3 is a perspective view, partially broken away, showing another example of an ink jet recording head.

Next, a manufacturing method of an ink jet recording head in one example according to the present invention will be described below. Here, an instance of fabricating the ink jet recording head as shown in FIG. 3 will be described. FIG. 3 is a typical perspective view showing a constitution of the ink jet recording head in this example.

First, the ink jet recording head as shown in FIG. 3 will be described. The ink jet recording head is the same as that shown in FIG. 1, but to simplify the explanation, a constitution is taken in which three discharge ports 39*a* are provided, with a liquid channel 39*b* and an energy generating element being provided corresponding to each discharge port 39*a*.

While in this example, three energy generating elements are provided, the number of energy generating elements, corresponding liquid channels and discharge ports is not limited to three, but they can be provided by appropriately changing it to any other number.

FIGS. 4A to 4F show constitution of a substrate 41 in an ink jet recording head. As shown in this figure, three electricity-heat converters 42 (e.g., $HfB_2$+Al+$SiO_2$+Ta), three electrodes 43 connected at one end of respective electricity-heat converters, and a common electrode 44 provided commonly to all the electricity-heat converters 42 and connected at other ends of the electricity-heat converters 42 are formed as the film, with the semiconductor manufacturing process, such as etching, vapor deposition or sputtering, and arranged at predetermined spacings. The electricity-heat converter 42 is an energy generating element for generating the thermal energy to discharge the ink, wherein it is limited to such a form, but a piezoelectric element for generating the mechanical energy to instantly apply the discharge pressure on the ink can be used. The side of the electrode 43 not joining with the electricity-heat converter 42 is an electrical connecting portion 32*b* (FIG. 3), and by applying the voltage between the electrical connecting portion 32*b* and the common electrode 44, a corresponding electricity-heat converter 42 is heated.

In order to improve the durability, it is commonly practiced to provide a variety of functional layers such as a protective film on the element surface 31*a* including each electrode 32 and each electricity-heat converter 32*a*. This example can take effect, irrespective of those functional layers and the quality of material.

Figure 4A:
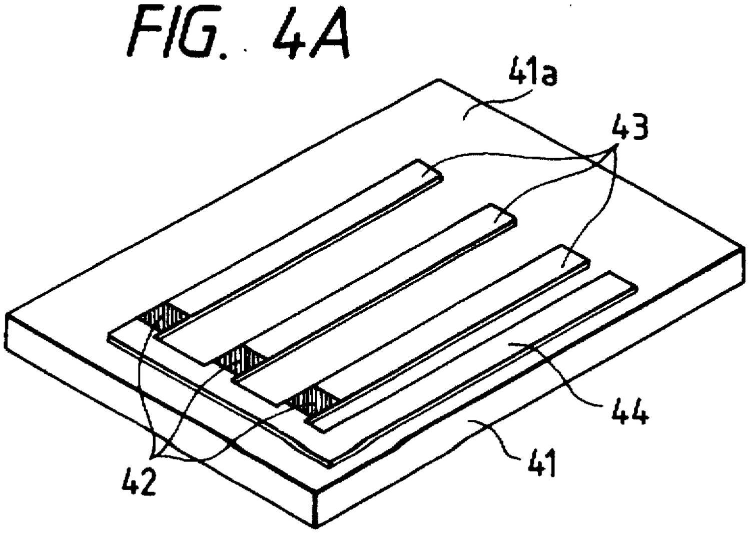
Figure 4B:
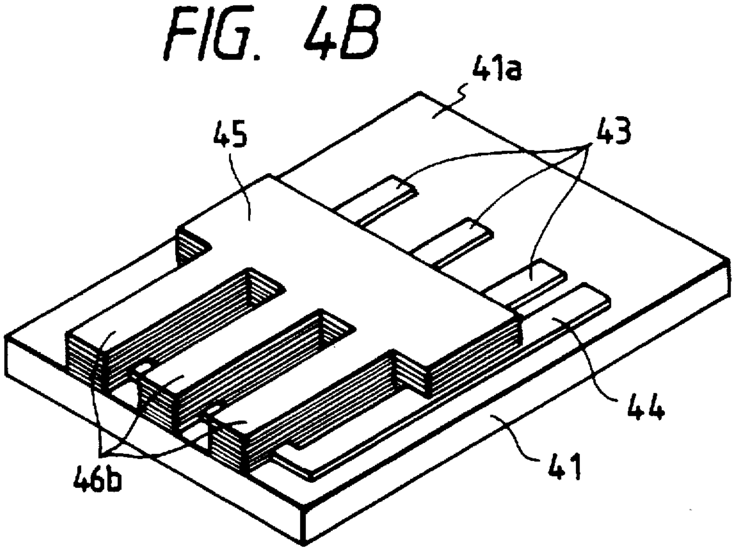

First, the solid layer 45 is formed on the element surface 41*a* of the substrate 41 as a pattern-like mold corresponding to the discharge port 39*a* (FIG. 3) for discharging the ink, a part of the liquid chamber 39*c* (FIG. 3) for storing the ink to be supplied to the discharge port 39*a*, and the liquid channel 39*b* (FIG. 3) communicating between the discharge port 39*a* and the liquid chamber 39*c*, as shown in FIG. 4B. As a result, three liquid channel corresponding portions 46*b* corresponding to liquid channels 39*b* among the solid layer 45 cover the electrodes 43 and the electricity-heat converters 42, respectively.

The solid layer 45 is made of a material which is removable in a later process. As to the material and the forming method, the solid layer 45 is formed by 1) applying a liquid photosensitive resin (with either positive or negative photosensitive base) on the substrate 41, and using the photolithography, 2) laminating a dry film-like photosensitive resin (either positive or negative) on the substrate 41, and using the photolithography, 3) printing a curable or incurable resin on the substrate 41, 4) selectively laminating a metallic film on the substrate 41 or removing therefrom.

In this case, from the viewpoint of easy operation, easy removal in the later process, and necessary accuracy in processing, the photolithography as above cited in 1) and 2) is preferable, and particularly, the photosensitive resin having a positive photosensitive base is more preferable.

As an example, photolithography means can be used in which a positive or negative dry developing photoresist or dry film having an appropriate thickness is applied or pasted on the element surface 41*a*, a pattern corresponding to the discharge port, the liquid channel 46*b* and the liquid chamber 46*c* among the photoresist or dry film is exposed with or without a mask, and developed, so that the solid layer 45 having the pattern corresponding to the discharge port 46*a*, the liquid channel 46*b* and the liquid chamber 46*c* is formed on the element surface 41*a*. In this case, the material of photoresist or dry film must be dissolved and removed by solvent in a process as described hereinafter. Also, the positive photoresist (photosensitive dry film) is more preferable than the negative type, as it is superior in removing the pattern-like solid layer 45 which is dissolved and removed in a process as described hereinafter, and can be formed with its cross-sectional shape closer to a rectangle. Other than the photolithography means as above described, the pattern-like solid layer 45 can be provided in an appropriate thickness by printing means such as the screen printing or the intanglio printing using an intaglio made by etching a metal substrate (e.g., NiCu). As the material of the solid layer applicable to the printing means, there are water soluble polyvinylalcohol resin, or solvent soluble vinyl chloride, vinyl acetate, vinyl chloride-vinyl acetate copolymer and styrene resin.

As a leading end portion of the liquid channel 39*b* becomes the discharge port 39*a*, the discharge port 39*a* can be advantageously formed at the position of an end face of the substrate 41 if the solid layer 45 on a region where the liquid channel 39*b* is to be formed is provided up to an external end portion of the substrate 41.

Figure 4C:
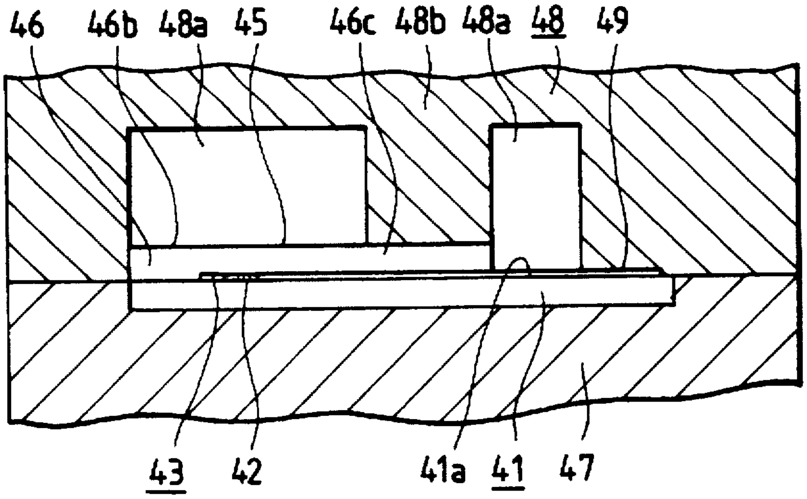

Next, with the transfer molding, the structural member 39 (FIG. 3) is fused onto the element surface. 41*a* where the solid layer 45 of the substrate 41 is formed while at the same time being molded. A mold for use with the transfer molding consists of a first mold 47 and a second mold 48, as shown in FIG. 4C. The first mold 47 is formed with a recess portion having the depth of the same size as the thickness of the substrate 41, into which the substrate 41 is fitted and fixed therein, and is constituted so that the element surface 41*a* of the substrate 41 may lie on the same plane as the parting plane when the substrate 41 is inserted into this recess portion.

Here, the depth of the recess portion in the first mold 47 is made the same size as the thickness of the substrate, but when the substrate 41 is covered partially or totally, with the transfer molding, another space (into which the transfer material can flow) should be made on a lower portion of the substrate 41.

On the other hand, the second mold 48 is formed with a cavity portion 48*a* within which the structural member 39 (FIG. 3) constituting the discharge port 39*a*, the liquid channel 39*b* and the liquid chamber 39*c* is molded, in which a portion of inner wall in the cavity portion 48*a* is abutted against a three discharge port corresponding surface 46 which is a surface corresponding to the discharge port 39*a* of the solid layer 25, at the mold clamping. Also, the second mold 48 is formed with a protruding portion 48*b* inside the cavity portion 48*a*, which serves to form the cavity portion which becomes the liquid chamber 39*c* and the supply port through which the ink is supplied from the outside into the liquid chamber, on the structural member 39, in which a leading end face of the protruding portion 48*b* is abutted against an upper surface of the liquid chamber region corresponding surface 46 as shown which corresponds to a part of the liquid chamber 39 in the solid layer 45, at the mold clamping. Also, a part of the element surface 41*a* of the substrate 41 including an electrical connecting portion 43*b* of each electrode 43 is constituted to protrude from the cavity portion 48*a* toward the parting face side of the second mold 48.

The mold opening direction for the first and second molds 47 and 48 is vertical with respect to the element surface 41*a* of the substrate 41. The transfer molding can be performed by clamping the mold, and pouring the molding material through a pot and a runner into the cavity portion 48*a*.

In molding the structural member, each discharge port corresponding surface 46*a* abutting against the inner wall of cavity portion 48*a* in the second mold 48 and the liquid chamber region corresponding portion 46*c* abutting against a leading end face of the protruding portion 48*b* in the solid layer 45 will melt slightly with the heat at the molding to adhere to the inner wall of the cavity portion 48*a* and the leading end face of the protruding portion 48*b*, thereby preventing the molding material from entering therein.

Also, in order to prevent the molding material from entering unnecessary portion more securely, a soft member such as silicon rubber, fluororubber or polytetrafluoroethylene can be pasted at the leading end face of the protruding portion 48*b*.

Figure 4D:
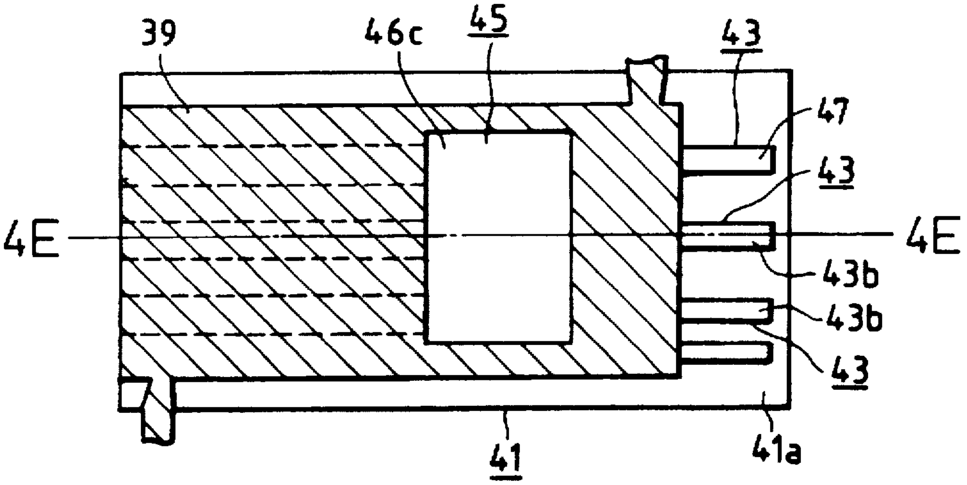
Figure 4E:
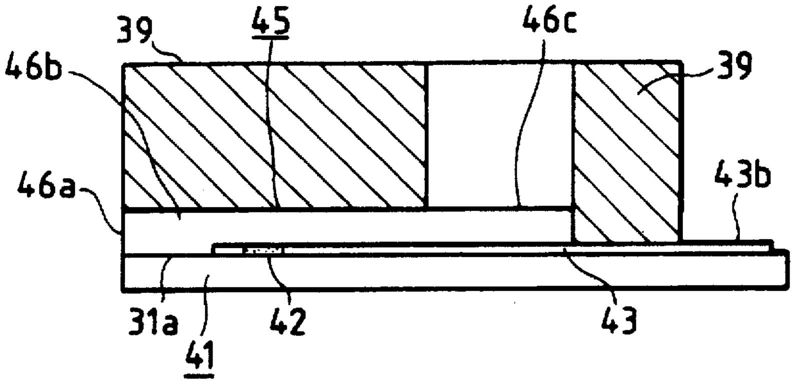

With the transfer molding, the structural member 39 is fused on the element surface 41*a* of the substrate 41 on which the solid layer 45 is formed, while at the same time being molded, as shown in FIGS. 4D and 4E. The structural member 39 has an exposed electrical connecting portion 43*b* of each electrode 43, in which among the surface of the solid layer 26, a surface of the liquid chamber region corresponding portion 46 abutted by the protruding portion 48*b* of the second mold 48 and the discharge port corresponding surface 26*a* are exposed, and other surfaces are covered.

With the transfer molding, a thermosetting epoxy resin is used as the material of the structural member (molded member) 39, and it can be performed in a general molding condition with a resin preheating temperature of 60° to 90° C., an injection pressure of 20 to 140 kgf/cm$^2$, a molding temperature of 100° to 180° C., a curing time of 1 to 10 min. and a postcure after molding. As other materials of the structural member 29, a cold setting, thermosetting, or ultraviolet setting liquid material can be used, for example, epoxy resin, acrylic resin, diglycol-dialkyl-carbonate resin, unsaturated polyester resin, polyurethane resin, polyimide resin, melamine resin, phenol resin, and urea resin. Whatever synthetic resin is used, the synthetic resin making up the structural member 39 is incompatible to the solid layer 45 and has a lower thermosoftening temperature than the solid layer 45.

Figure 4F:
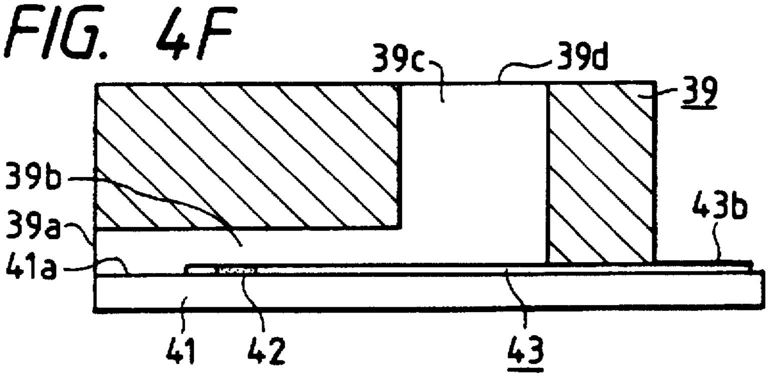

Next, the solid layer 45 is removed from the substrate 41 onto which the structural member 39 is fused while at the same time being molded. As means for removing the solid layer 45, optimal means in accordance with the material forming the solid layer 45 can be selected, but generally, such means is used that the substrate 21 having the structural member 39 fused while at the same time being molded is immersed into a solution of solvent dissolving, swelling or peeling the solid layer 45 to remove it. In this time, removal promoting means such as ultrasonic processing, spray, heating or agitation, can be used together as necessary. When a positive photosensitive resin is used for the solid layer 45, a water solution containing ketones, mainly acetone, ester, alcohol or alkali can be used as a solvent for removal. In FIG. 4F, the solid layer 45 is removed from the substrate 41 having the structural member 39 fused while at the same time being molded. Inside the structural member 39, a space is formed after the solid layer 45 is removed, in which the space constitutes three discharge ports 39*a*, three liquid channels 39*b*, the liquid chamber 39*c* and the supply port 39*d*.

As above, the ink jet recording head as shown in FIG. 3 can be fabricated. In this way, the registration of each liquid channel 39*b* with respect to each electricity-heat converter 42 (energy generating element) provided on the element surface 41*a* of the substrate 41 can be achieved when the solid layer 45 is formed in the element surface 41*a*, so that there is no need for any complex and expensive device for pasting the minute energy generating element of the first substrate and the minute liquid channel of the second substrate in precise registration, which was found in conventional methods.

The process for providing the structural member 39 which constitutes each discharge port 39*a*, each liquid channel 39*b* and the liquid chamber 39*c* is simpler and shorter in time than a conventional complex and trouble process of providing the structural member by leaving it for a long time with the application of a curable material mixed with a curing agent, or illuminating with the activation energy line after an activation energy line curable material is applied thereon, because the structural member 39 is fused onto the element surface 41*a* where the solid layer 45 is formed while at the same time being molded, with the transfer molding. Also, when the structural member 39 is molded, the supply port can be molded at the same time. Further, the liquid chamber 39*c* can be formed in any larger volume, without restriction by the thickness of the solid layer 45.

Here, the incompatibility between the solid layer 45 and the synthetic resin making up the structural member 39 will be described. The incompatibility means not to melt together, i.e., not to have the compatibility, or that the compatibility is very low, and it is necessary to be incompatible not only at room temperature, but also at manufacturing temperature (molding temperature).

As a method of examining the compatibility, a material making up the solid layer 45 and a synthetic resin making up the structural member 39 are dissolved and mixed into a solvent having a high solubility for both of them [one having generally a high solubility for various resins such as DMF (dimethylformamide), DMSO (dimethyl sulfoxide) or ketones is effective], and applied on a transparent plate such as a glass plate and dried. As when there is the compatibility, a transparent resin layer is formed on the transparent plate, while with the incompatibility, a milk white or white resin layer is formed, in which the compatibility or incompatibility can be judged by observing the transparent plate. Further, to judge the compatibility or incompatibility at manufacturing temperature can be made by observing whether or not the resin layer at specified temperature is transparent, or milk white to white, by heating this transparent plate gradually.

Next, a measuring method of thermosoftening temperature will be described. The thermosoftening temperature can be commonly obtained by measuring the penetration degree of needle with a device such as TMA (thermal mechanical analyzer). This method is performed by laying a fixedly loaded needle on a test piece, raising the temperature of the entire system gradually, and measuring the temperature at which the needle may penetrate into the test piece, to achieve the quantitative measurement. As the material making up the solid layer and the synthetic resin making up the structural member are both generally curable, the comparison of the thermosoftening temperatures should be made depending on the temperature variation in actual manufacturing process, by measuring the thermosoftening temperature before or after curing. The difference between the thermosoftening temperature of the material making up the solid layer and that of the synthetic resin making up the structural member is preferably above 10° C., and more preferably above 15° C., and most preferably above 20° C.

Next, the results of fabricating actually the ink jet recording head in this example will be described.

The solid layer 45 used was a dry developing photoresist of polycarbonate which was patterned with the exposure and development, and the synthetic resin making up the structural member 39 used was a curable epoxy resin composed of acryl-epoxy-halfesteroligomer and polyamide. This dry developing photoresist, in which the exposed portion only becomes gaseous and scattered, is obtained by adding onium salt as photooxidation agent to polycarbonate (Polymer J., 19(1), 31(1987)). The thermosoftening temperature at the exposed portion of the dry developing photoresist was 70° C. (decomposition), and the thermosoftening temperature at the unexposure portion was 200° C. On the other hand, the thermosoftening temperature of the curable epoxy resin was 160° C. at blend state (uncured state), and 220° C. after curing. In this case, the thermosoftening temperature at the solid layer 26 is 200° C. because the unexposure portion is used as the solid layer 26, and the thermosoftening temperature of the synthetic resin making up the structural member 29 is 160° C. because it is used before curing.

The examination as to the compatibility has confirmed the incompatibility in a temperature range from room temperature to 200° C., by dissolving both the dry developing photoresist and the synthetic resin into DMF and applying it on the glass plate.

The ink jet recording head as shown in FIG. 3 was fabricated with a procedure as shown in FIGS. 4A to 4E and an excellent ink jet recording head could be obtained without deforming the liquid channel.

Though this example was described, it is unnecessary to use a strong solvent for the development because of the use of the dry developing photoresist as the solid layer 45, and thus unnecessary to use particularly a curable/crosslinking resin as the synthetic resin making up the structural member 39, so that it is possible to use the thermoplastic plastics having excellent characteristics.

Next, a second example of a manufacturing method of a recording head will be described.

In the first example of the manufacturing method of the recording head as above described, the discharge port corresponding surface 46*a* was formed in the solid layer 45, the structural member 39 was molded with the discharge port corresponding surface 46*a* being exposed, and after the discharge port corresponding surface 46*a* was removed, the opening itself became the discharge port 39*a*, whereas in the method of this example, a liquid channel corresponding portion of the solid layer is provided on the element surface of the substrate, extended beyond the position where the discharge port is formed, and the structural member is fused on the element surface while at the same time being molded, and after releasing the mold, cut off with a resin board diamond blade (with a thickness of 0.3 mm, #2400) at the position of forming the discharge port in a state where the structural member and the substrate are fused together, and then the solid layer is removed after polishing of the cut face. Other points are the same as in the first example of the manufacturing method of the recording head, and the explanation will be omitted.

In this example, the cut face becomes the discharge port face where a plurality of discharge ports are arranged in parallel, but as the solid layer is not yet removed in polishing the cut face, there is an advantage that polished matters will not enter the liquid channel. Other points can provide the same effects as in the first example of the manufacturing method of the recording head.

Next, the second example of the manufacturing method of the ink jet recording head according to the present invention will be described. This example is such that two ink jet recording heads as shown in FIG. 3 are fabricated at a time (so-called two impression), in which two pieces of ink jet recording head are fabricated collectively in the positional relation in which discharge ports are opposed to each other, and then cut off at a central portion (a position where the discharge port is formed), thereby obtaining two ink jet recording heads. FIGS. 5A to 5D are views for explaining this manufacturing method.

Figure 5A:
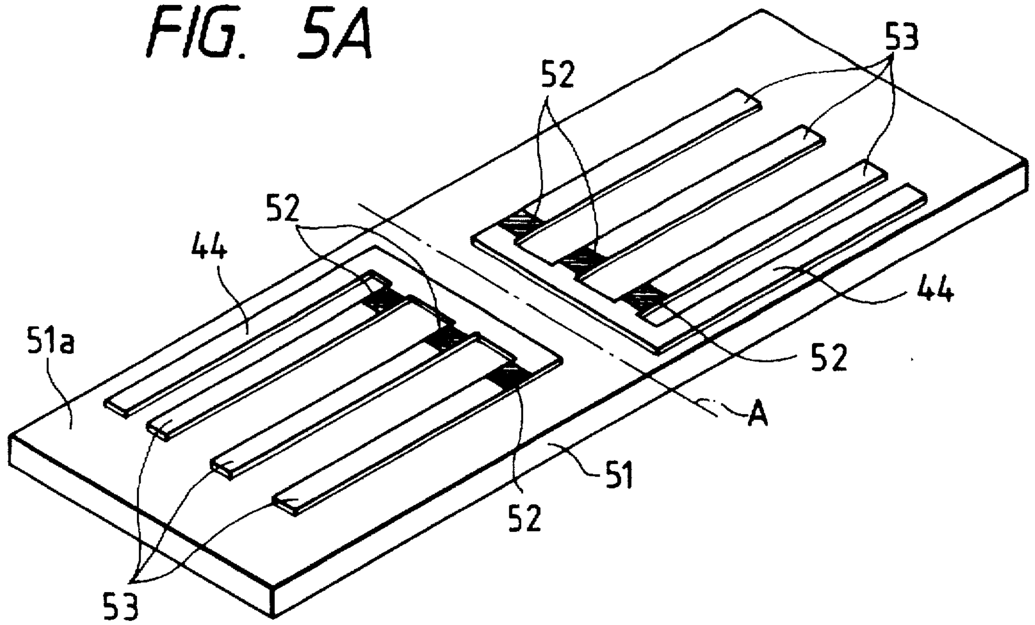
Figure 5B:
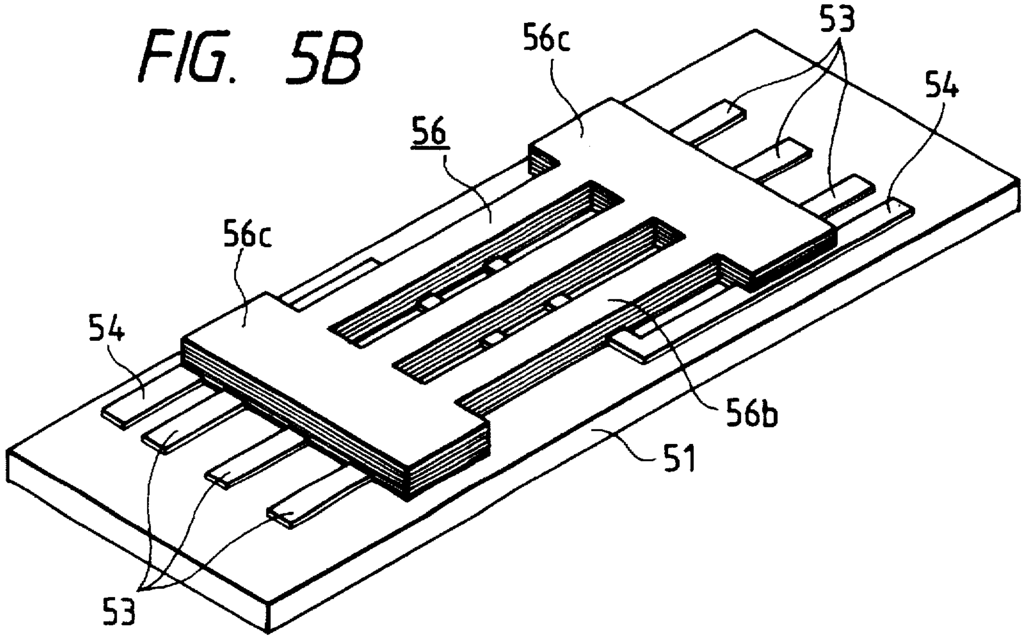

As shown in FIG. 5A, on the element surface 51*a* of the substrate 51 having the size corresponding to two recording heads opposingly arranged, the electricity-heat converter 52*a*, the electrode 53, and the common electrode 44 are formed corresponding to two ink jet recording heads (a case of six is shown in this example). In this case, electricity-heat converters 52*a* are arranged in symmetry with respect to the curring position (discharge port forming position A as shown) in a later process. In this way, liquid channels corresponding respectively to two ink jet recording heads are advantageously concatenated in a straight line. Next, as shown in FIG. 5B, the solid layer is laminated on a portion to be used as the liquid channel and a portion to be used as a part of the liquid chamber. As electricity-heat converters 52 are arranged in symmetry with respect to the discharge port forming position A, a portion to be used as the liquid channel, i.e., liquid channel corresponding portion 56*b* is provided continuously in straight line from a portion to be used as a part of one liquid chamber (lower end), i.e., liquid chamber region corresponding portion 56*c* to the other liquid chamber region corresponding portion 56*c*. At this time, the solid layer on a portion to be used as the liquid channel and the solid layer corresponding to the liquid chamber can be integrally or separately provided.

As in the above example, two structural members 59 corresponding to two ink jet recording heads are formed integrally, with the transfer molding. Also in this case, a material making up the solid layer 55 and that making up the structural member 59 are incompatible, as in the above example, in which the thermosoftening temperature is lower for the synthetic resin. Afterwards, it is cut off at the plane including the discharge port forming position A and vertically to the substrate 51 as the cutting face. As a result, the discharge port appears on the cutting face because the portion to be used as the liquid channel are continuous in straight line for both ink jet recording heads, whereby two ink jet recording head corresponding portions are formed. Afterwards, if the cutting face is polished and the solid layer 55 is removed, the ink jet recording head which is the same as above described can be fabricated two at a time.

Figure 5C:
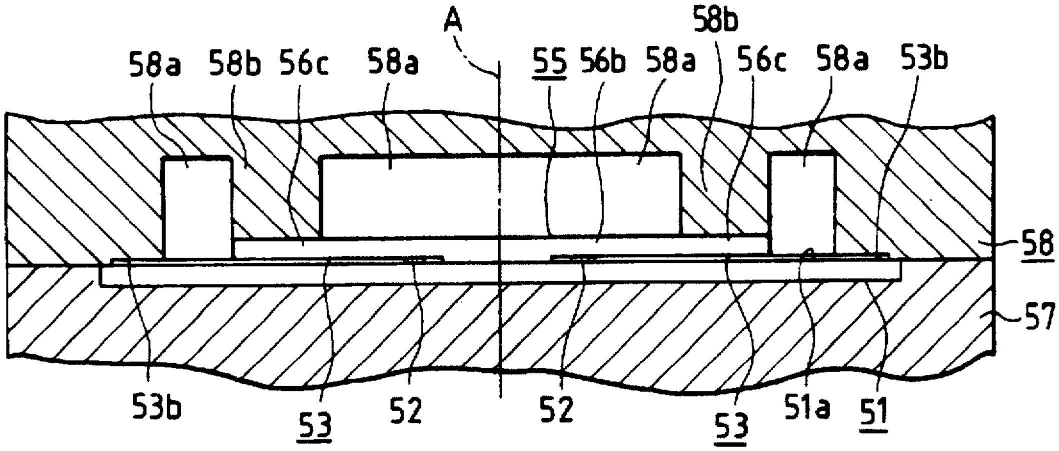

Next, the mold useful in the transfer molding will be described. FIG. 5C is a cross-sectional view in a state where the substrate 51 with the solid layer 55 completely formed is mounted on this mold. The first mold (lower mold) 57 is provided with a recess portion of the same shape as the substrate 51, with the substrate 51 being fitted into this recess portion. The second mold (upper mold) 58 is provided with a cavity portion 58 corresponding to the recess portion of the first mold, as in the above example. Two projections 58*b* corresponding to respective liquid chambers of two ink jet recording heads are provided in the cavity portion 58. A leading end of the projection 58*b* abuts against the liquid chamber region corresponding portion 56*c*, as in the above example, and the structural member 59 having two ink jet recording heads integrated can be fused and formed collectively on the substrate 51, by injecting and curing a molding material through a pot and a runner, not shown, into the cavity portion 58*a*, in this state.

Figure 5D:
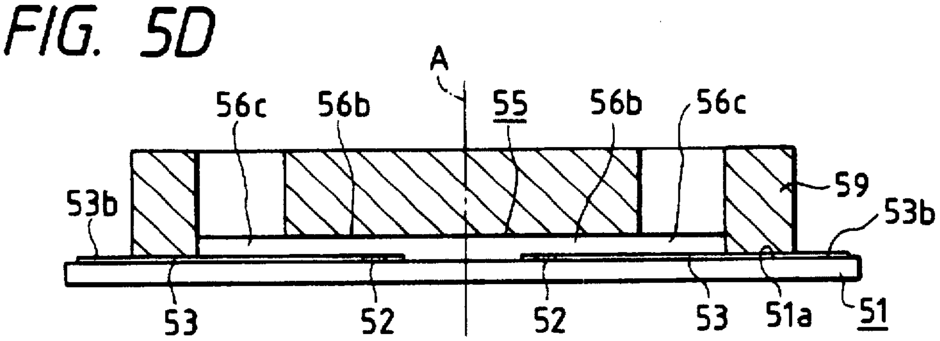

The structural member 59 as shown in FIG. 5D is fused onto the element surface 51 of the substrate 51 where the solid layer 55 is formed while at the same time being molded, with the transfer molding, using the first mold 57 and the second mold 58.

The substrate 51 where the structural member 59 corresponding to two recording heads are fused while at the same time being molded is cut off at the discharge port forming position A after releasing the mold, and after polishing each cut face (including the cut face of the structural member 59) of the substrate 51 separated into two pieces, the solid layer 55 which remains inside is removed.

Other points than above described are the same as in the first example of the manufacturing method of the recording head, and the explanation will be omitted.

In this example, there is an advantage that two recording heads can be obtained at a time with almost the same processes as in the first or second example of the manufacturing method of the recording head.

Next, a fourth example of the manufacturing method of the recording head will be described.

This example, which is an application of the method in the third example of the manufacturing method of the recording head as previously described in which two recording heads are obtained at a time, shows a method of obtaining a plurality of parts of recording heads, with two recording heads as a pair.

Figure 6A:
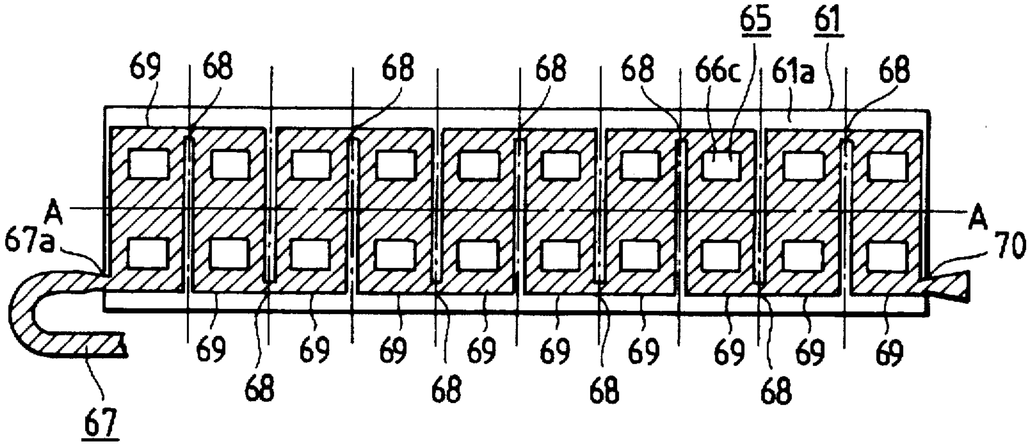
Figure 6B:
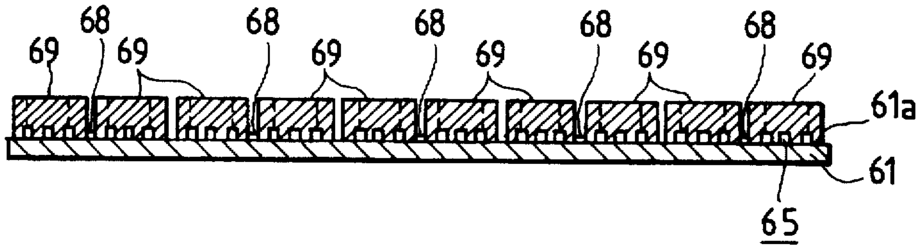

In FIGS. 6A and 6B, the element surface 61*a* of strip-like substrate 61 are formed with electricity-heat converters, electrodes and common electrode, corresponding to the number of ink jet recording heads to be formed, and with the structural member 69 corresponding to two recording heads being as a pair, a plurality of pairs (10 pairs in the figure) of structural members 69 are arranged in parallel while opposed surface is commonly used in the opposed arrangement (in concatenated state), and fused onto the element surface while at the same time being molded, with the transfer molding, in which the structural member 69 of each pair is in symmetry with respect to the discharge port forming position which is an opposed plane in the opposed arrangement. On the element surface 61*a* of the substrate 61, of course, are provided the electrode (not shown) having the electricity-heat converter and the solid layer 65, corresponding to the plurality of pairs of structural members 69.

Describing the arrangement of a runner for molding the plurality of pairs of structural members 69, a gate portion 67*a* of a main runner 67 consecutively provided from a sprue, not shown, is disposed on a portion at one end farthest from the discharge port forming position A of one pair of structural members 69 at the left end as shown, and on a portion at the other end farthest from the discharge port forming position A on the side of the one pair of structural members 69 opposite to the gate portion 67*a*, a subrunner 68 consecutive with adjacent one pair of structural members 69 is disposed. Between the plurality of structural members from left to right end as shown are disposed alternately the subrunner 68 each one with the discharge port forming position A interposed, in the same configuration, and the structural member 69 of the pair at the right end as shown has an air bleeding portion 70 disposed at a position diametrically opposite to the last subrunner 68. By arranging the runner as above, the molding material is extended uniformly, and even if each structural member 69 is distorted due to residual internal stress after the molding, the distortion near the discharge port can be minimized because positions of each subrunner 68 and the gate portion 67*a* are left away from the discharge port.

The substrate 61 onto which the plurality of pairs of structural members 69 are fused while at the same time being molded is cut off at the discharge port forming position A after releasing the mold, each cut face (including the cut face of each structural member 69) of the substrate 61 divided into two pieces is polished, and then the solid layer 65 which remains inside is removed. It is also possible that the substrate 61 divided into two pieces is further cut along a boundary line between two adjacent structural members into one recording head correspondingly, and polished, and then the solid layer 65 is removed.

Other points than above described are the same as in the third example of the manufacturing method of the recording head, and the explanation will be omitted.

In this example, plural recording heads can be fabricated at a time. In a case where the substrate 61 onto which the plurality of pairs of structural members 69 are fused while at the same time being molded is cut off along the discharge port forming position A after releasing the mold, and the solid layer 65 is removed in a state of being separated into two pieces, each recording head corresponding portion is not yet separated, and so the handling in removing the solid layer is more convenient.

Next, a fifth example of the manufacturing method of the recording head will be described.

Figure 7:
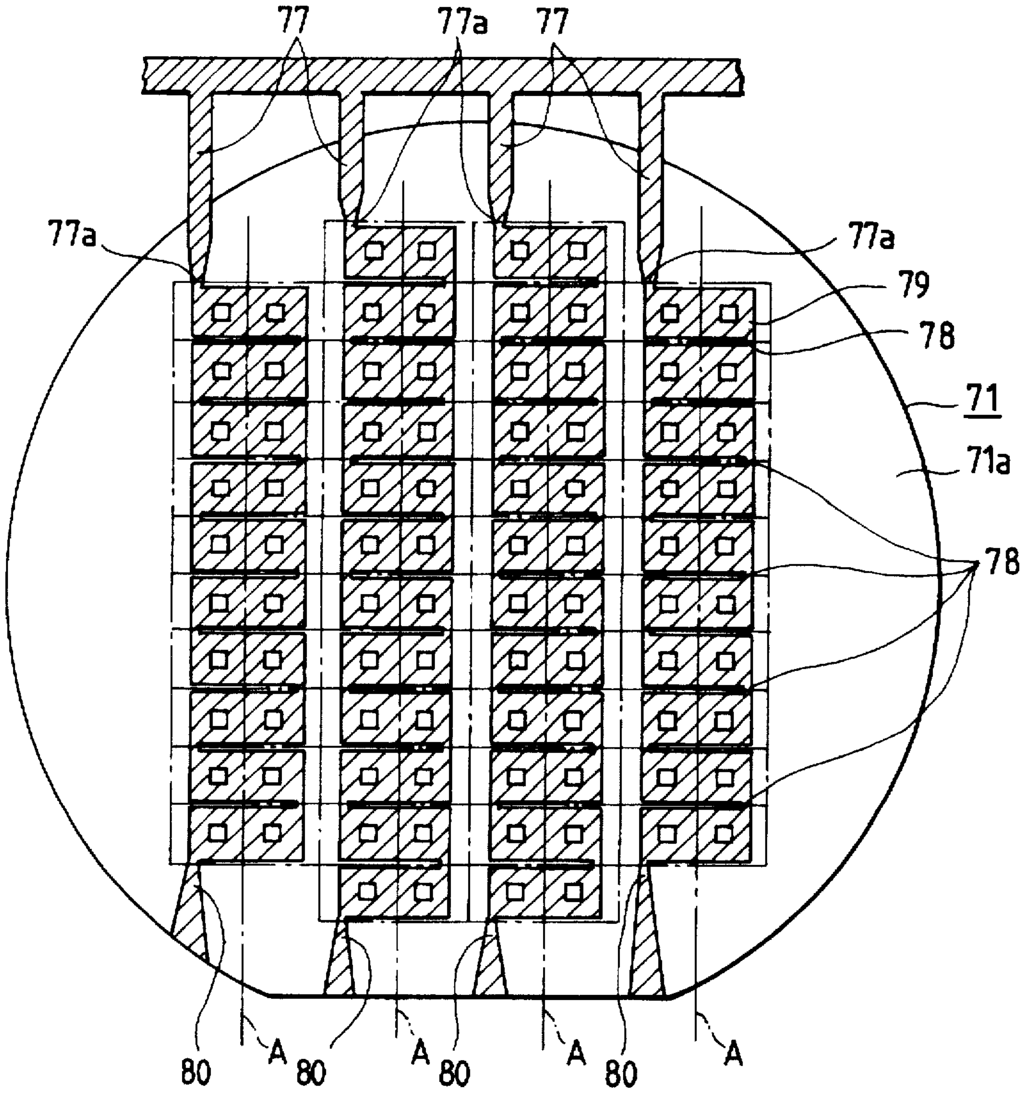
FIG. 7 is a view showing another manufacturing method of an ink jet recording head.

In the fourth example of the manufacturing method of the recording head as previously described, a plurality of pairs of the structural members 69 are fused onto the element surface 61*a* of the strip-like substrate 61 while at the same time being molded, whereas in this example, a plurality of pairs (44 pairs, 88 pieces are exemplified in the figure) of structural members 79 are fused onto the element surface 71*a* of the disk-like substrate 71 such as a silicon wafer (with a diameter of 5 inches) while at the same time being molded, as shown in FIG. 7. 44 pairs of structural members 89 are arranged in 4 columns, with one main runner 77 being provided for each column. Each subrunner 78 and the air bleeding portion 80 are disposed in the same configuration as in the fourth example of the manufacturing method of the recording head as previously described.

Also, as the peripheral portion of the substrate 71 is necessarily brought into contact with the second mold at the clamping, it follows that the substrate 71 is substantially a mold corresponding to the second mold, and the shape of the first mold is not specifically limited, but a planar constitution without recess portion can be adopted. Further, the sprue or pot, not shown, provided on the second mold, can be configured to be located upward of the substrate 71, in which the entire runner is provided only within an area where the second mold and the substrate 71 are in contact, so that the mold property of the substrate 71 corresponding to the second mold becomes clearer.

Other points than above described are the same as in the fourth example of the manufacturing method of the recording head as previously described, and the explanation will be omitted.

Next, a sixth example of the manufacturing method of the recording head will be described.

The first to fifth examples of the manufacturing method of the recording head as previously described were described in connection with the example where the liquid chamber region corresponding portion was formed on the solid layer provided on the element surface of the substrate, whereas this example is concerned with a method in which the liquid chamber region corresponding portion is not formed on the solid layer provided on the element surface of the substrate.

Figure 8:
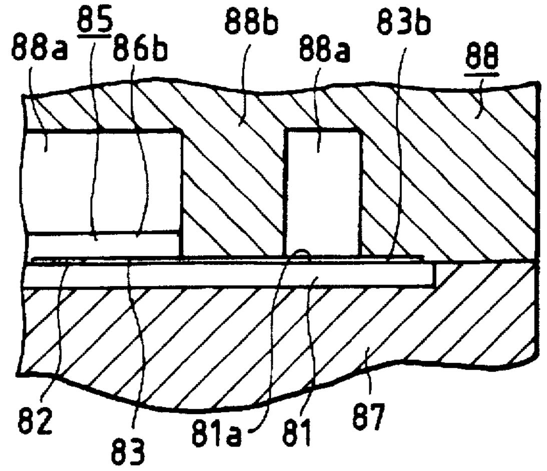
FIG. 8 is a cross-sectional view of essential parts for a mold useful in one example of the manufacturing method of an ink jet recording head.

In FIG. 8, the solid layer 85 provided on the element surface 81 of the substrate 81 is not formed with the liquid chamber region corresponding portion. In this case, the protruding portion 88*b* of the second mold 88 has its leading end face brought into contact with the element surface 81*a* on which each electrode 92 is formed as the film, at the clamping, and a part of side wall at its leading end portion is brought into contact with a surface corresponding to connect portion of each liquid channel corresponding portion 86*b* to the liquid chamber.

Other points than above described in this example can be made the same constitution as that of each example in the manufacturing method of the recording head as previously described.

Next, a mold for forming the protruding portion at an opening end of the supply port as shown in the second example of the recording head will be described.

Figure 9:
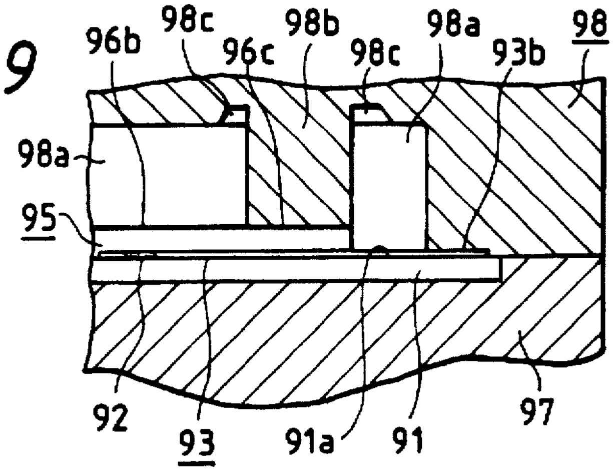
FIG. 9 is a cross-sectional view of essential parts for a mold useful in another example of the manufacturing method of an ink jet recording head.

The mold for forming the protruding portion is such that a subcavity portion 88*c* is formed all around a foot portion of the protruding portion 98*b* in the second mold 98, as shown in FIG. 9.

By forming the subcavity portion 98*c* in the second mold for use in each example of the manufacturing method of the recording head as previously described, the protruding portion can be formed at the opening end of the supply port in the recording head to be fabricated.

A mold which has improved the mold for use in respective examples as previously shown and further allows a uniform molding without damaging the substrate on which elements are disposed will be described.

Figure 10:
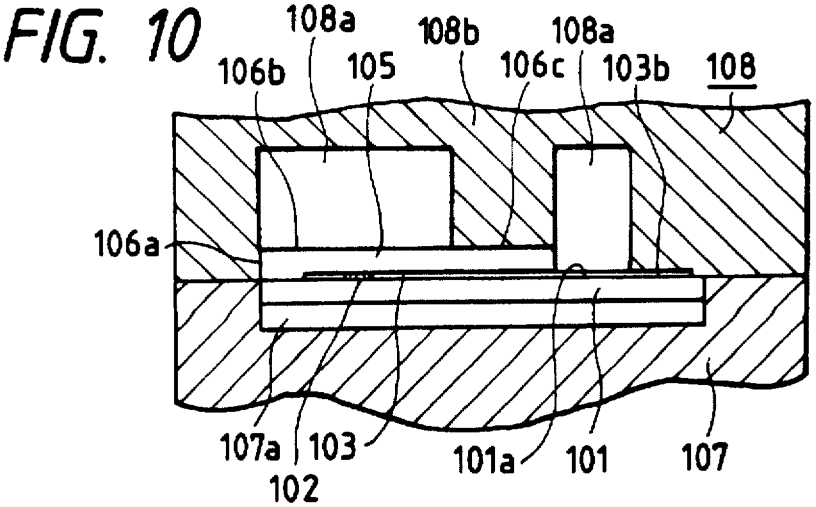
FIG. 10 is a view for explaining the first example of the manufacturing method of an ink jet recording head.

As shown in FIG. 10, the mold consists of the first mold 107 and the second mold 108. On the first mold is formed a recess portion into which is fitted and fixed the substrate 101 provided with the solid layer 105 as formed with the method as shown in the previous example.

Further, a bottom face of the recess portion is made of a soft member 107*a*, in which the whole surface of a face which is not the element surface 101*a* of the substrate 101 fitted into the recess portion is brought into contact with the soft member 107*a*. Owing to this, when the mold is clamped for molding, and the molding material is injected into the cavity portion 38*a*, the substrate 31 is subject to uniform pressure. As the soft member 107*a*, silicon rubber, fluororubber or polytetrafluoroethylene can be used.

Also, in molding the structural member, the surface of the solid layer 105 may be eluted into the molding material rendered liquid, due to the heat of the molding, and therefore, there may be produced a spacing between the leading end face of the protruding portion 108*b* and the liquid chamber region corresponding portion 106*c* of the solid layer, into which the molding material may be entered. To avoid it, the solid layer 105 is made of a soft material, and the protruding portion 108*b* pressed over and abutted against the liquid chamber region portion 106*c* can be used. Or at least the leading end portion of the protruding portion 108*b* can be constituted of the soft member such as silicon rubber, fluororubber or polytetrafluoroethylene.

The detailed molding method using this mold is the same as in the previous example, and the explanation will be omitted.

Also, in this example, as a bottom face of the recess portion provided on the first mold 107 is made of the soft member 107*a*, the force applied on the substrate 101 at the molding becomes uniform. As a result, there will not occur such cases that undue force may be applied on the substrate 101 to damage it, or the electricity-heat converter 102 or electrode 103 on the substrate 101 is broken, or peeled away from the sustrate 101.

Also, there is an advantage that even if at the molding, the molding material is entered into the spacing between the discharge port corresponding portion of the solid layer and an inner wall of the second cavity portion, the blockade of discharge port or liquid channel will not occur.

Figure 11:
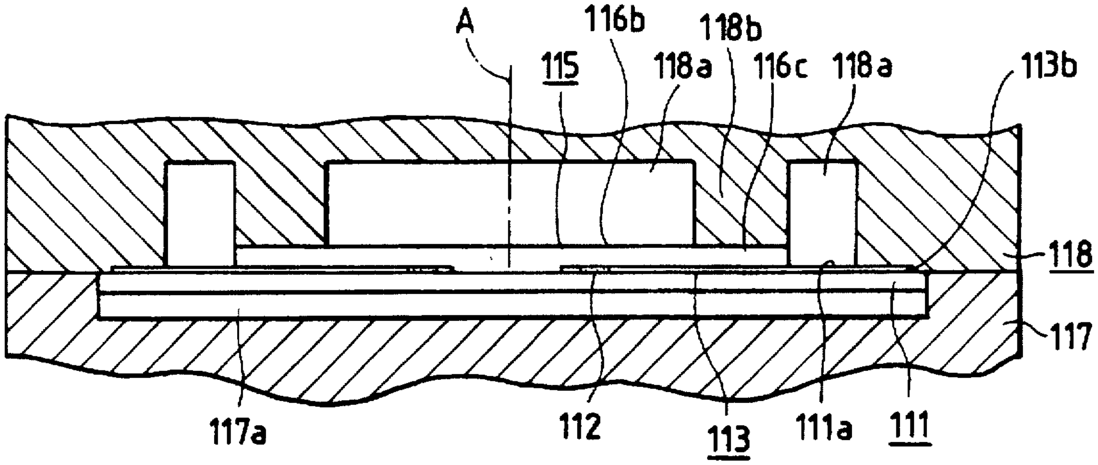
FIG. 11 is a cross-sectional view of essential parts for a mold useful in one example of the manufacturing method of an ink jet reocrding head.

Further, when two recording heads are molded at a time as previously described, the mold as shown in this example can be used. Such a mold is shown in FIG. 11.

As in the previous example in which two heads are molded at a time, the substrate 111 on which the heating element 112 and the electrode 113 are arranged and the solid layer 115 is formed is mounted within the mold consisting of the first mold 117 and the second mold 118.

This mold 117 is also provided with the soft member 117*a* as in the previous example, thereby taking the same effects.

Figure 12:
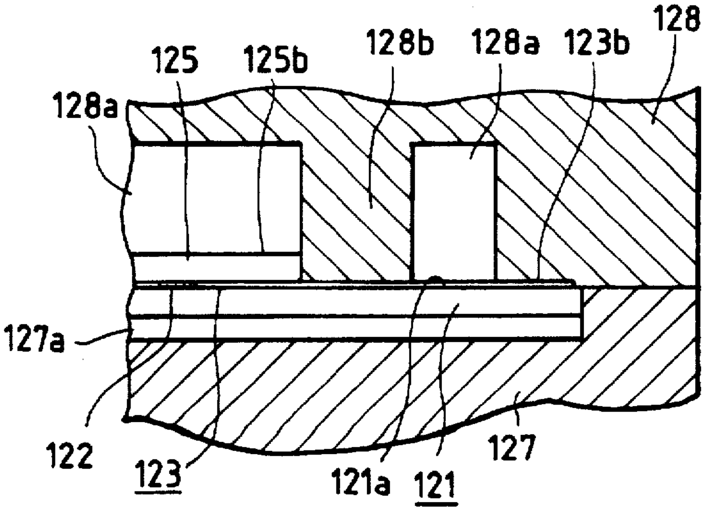
FIG. 12 is a cross-sectional view of essential parts for a mold useful in another example of the manufacturing method of an ink jet recording head.

FIG. 12 also shows the mold having the soft member, and this is an example where the liquid chamber region portion is not formed on the solid layer 125 provided on the element surface 121*a* of the substrate 121.

Further, when multiple ink jet recording heads are produced from one piece of silicon wafer at a time, as shown in FIG. 7, the same effects can be obtained even if a portion abutting a lower face of the wafer may be constituted of a soft member.

In these examples, the molding method can be the same as in the previous examples, and the explanation will be omitted.

Also, as shown in this example, the method of using the soft member as a part of the lower mold and the upper mold is not limited only to the above described mold, but the same effects can be obtained by using the mold in the previous example or a mold as hereinafter described.

Next, at the transfer molding of the present invention, the direction in which the molding material (e.g., resin) flows, and the molded member (ink jet head) will be described.

In the manufacturing method of the molded member, particularly, the recording head, when the flowing direction of resin in molding the resin is largely different from the flowing direction of ink in the ink flow channel, for example, when the flowing direction of resin and that of ink are orthogonal to each other, the shape of the solid layer may sometimes be distorted because the solid layer playing a role of the mold for forming the ink flow channel is forced to flow with the resin from an end upstream of the ink flow, which may remarkably occur particularly when the heat resisting temperature of the solid layer is not sufficiently higher than the temperature of molten resin at the molding. In this case, the shape of ink flow channel is not formed in symmetry with respect to the flowing direction of ink, and consequently, there is a risk that a desired discharge of ink becomes difficult because the discharge direction of ink is scattered, or the discharged ink becomes oblate.

Accordingly, it is desirable in the manufacturing method of the ink jet recording head to form the shape of ink flow channel substantially in symmetry with respect to the flowing direction of ink.

To meet such a requirement, it is effective that the flowing direction of resin in molding the resin may be made substantially the same as that of ink in the ink flow channel.

As the flowing direction of resin in molding the resin can be made substantially the same as that of ink in the ink flow channel, even if the solid layer serving as the mold for forming the ink flow channel is forced to flow owing to the resin from the end upstream of the resin flow, the shape of residual solid layer remains in symmetry with respect to the flow direction of ink, with little fear of failure in discharging the ink.

Figure 13A:
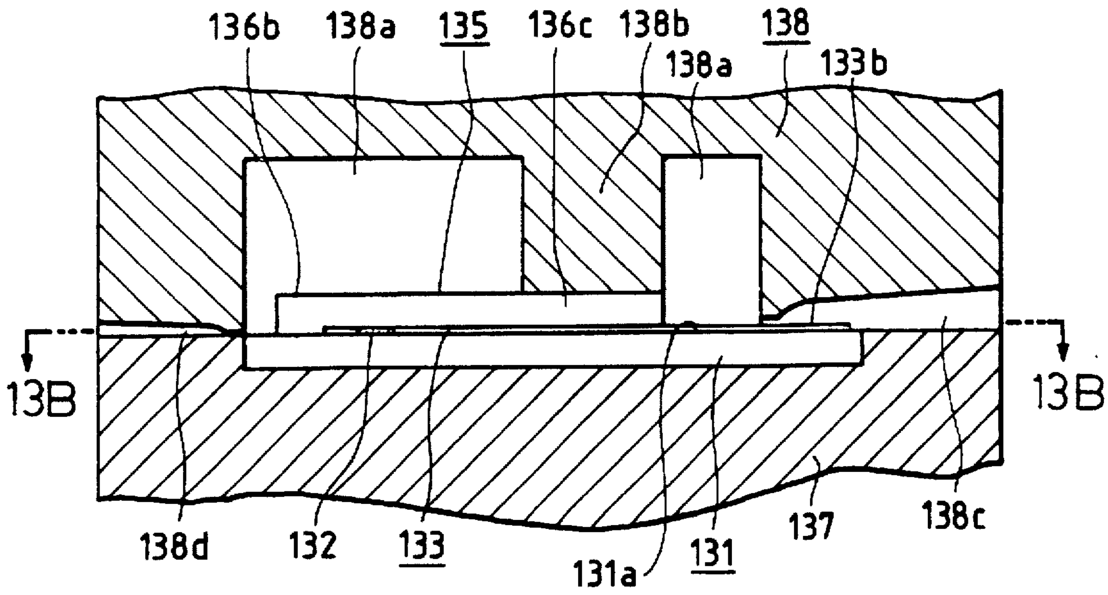
Figure 13B:
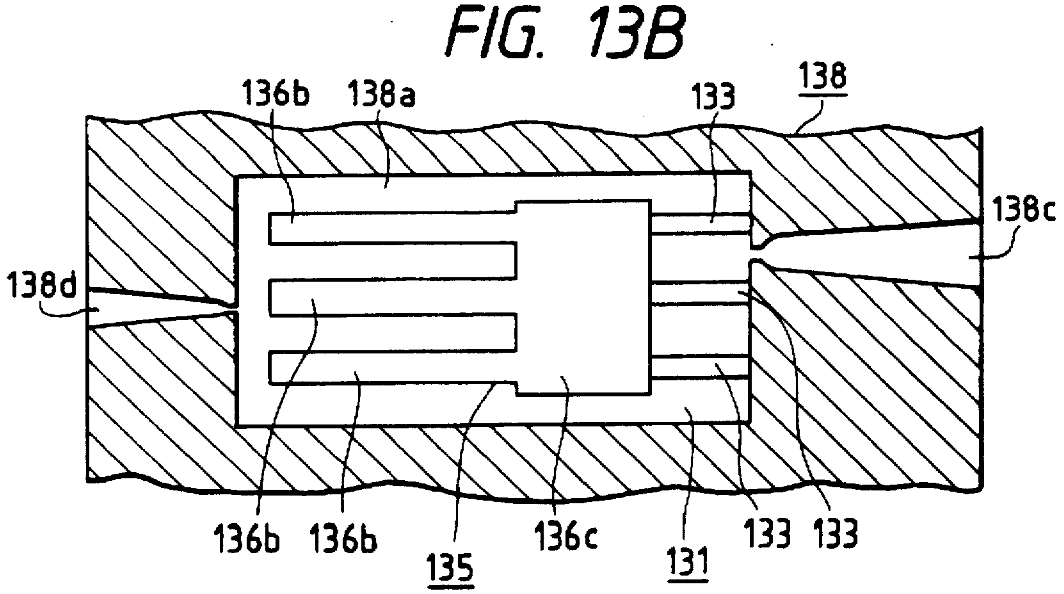

By using the mold as shown in FIGS. 13A and 13B, the ink jet head capable of a further stable discharge of ink can be obtained. In this example, the constitution except for the runner is the same as previously described.

The runner 138*c* for supplying molten resin into the cavity portion 138*a* opens to an inner wall of the cavity portion 138*a* on the electrical connecting portion side 133*b* of the electrode 133 and an air bend 138*d* opens to the inner wall of the cavity portion 138*a* on the ink flow channel side 136*b* (see FIG. 1B).

In molding the resin, molten resin flows from the runner 138*c* into the cavity portion 138*a*, passing around the protruding portion 138*b* to flow substantially in parallel direction to that of each ink flow channel 136*b* of the solid layer 135, that is, to flow substantially in the same direction as the ink flow direction in the ink channel completed, filling the cavity portion 138*a*. At this time, the air within the cavity portion 138*a* is exhausted out of the air bend 138*d*. Also, the liquid chamber portion 136*c* of the solid layer 135 abutting against the leading end face of the protruding portion 138*b* in the second mold 28 will slightly melt due to the heat at the molding, thereby adhering to the leading end face and preventing the molten resin from entering therein. On the leading end face of the protruding portion 138*b* can be pasted silicon rubber, fluororubber or polytetrafluoroethylene.

Also, a portion serving as the discharge port of the substrate 131 and the structural member 139 is cut off after releasing the mold, with one end of each ink flow channel in the solid layer 135 being exposed.

Figure 14:
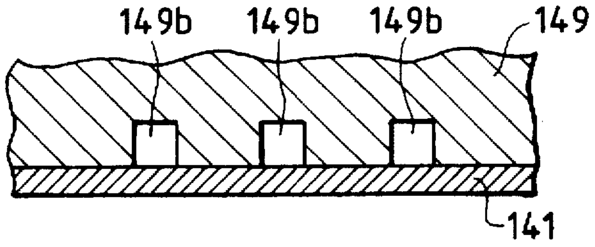
FIG. 14 is a view showing a cross section of the ink flow channel of a recording head fabricated in this example.

In this example, the position at which the runner 138*c* of the second mold 138 opens is placed on the inner wall of the cavity portion 138*a* on the electrical connecting portion side 133*b* of the electrode 133, while the position at which the air bend opens is located on the inner wall of the cavity portion 138*a* on the ink flow channel side 136*b*, so that the molten resin flows substantially in parallel direction to each ink flow channel portion 136*b* of the solid layer 135, i.e., substantially in the same direction as the ink flow direction in each ink flow channel 149*b* as completed. As a result, even if each ink flow channel portion 136 of the solid layer 135 is forced to flow from the end upstream of the resin flow, the shape of each residual ink flow channel 136*b* remains symmetrical with respect to the flow direction of ink. Accordingly, the cross-sectional shape of each ink flow channel 149*b* formed therein is also made symmetrical with respect to the flow direction of ink, as shown in FIG. 14.

This example was described in connection with the example in which the resin is molded with the transfer molding, but this example does not have to be limited to such transfer molding, but other molding methods can be used.

As the comparative example, an example will be described in which the flow direction of resin in molding the resin and that of ink in the ink channel are substantially perpendicular.

Figure 15:
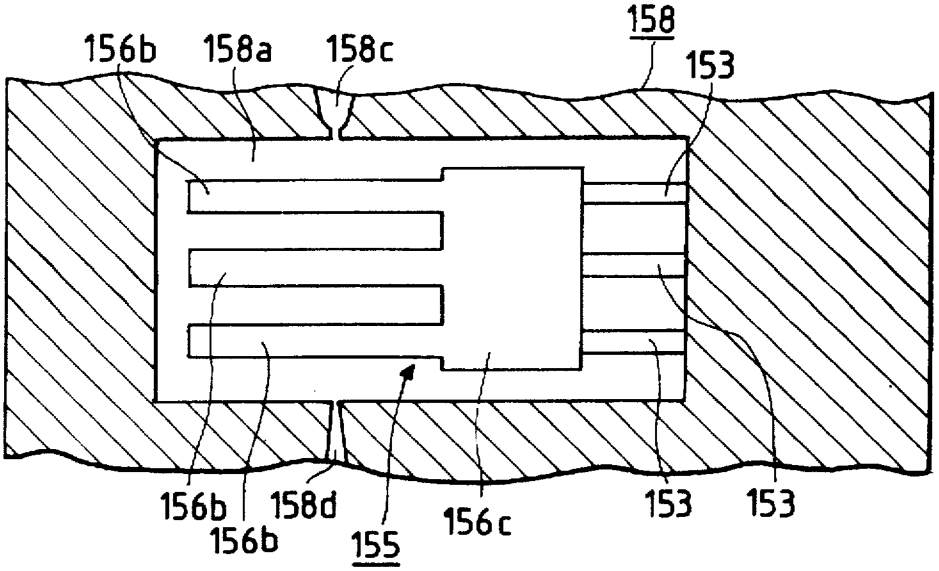
FIG. 15 is a typical cross-sectional view showing a mold of comparative example.

In FIG. 15, the second mold 158 has the same constitution as the second mold 138 shown in FIGS. 13A and 13B, but differs in that in the inner wall of the cavity portion 158, two inner walls parallel to the ink flow channel portion 156*b* have opened a runner 158*c* and an air bend 158*d*, respectively.

Figure 16:
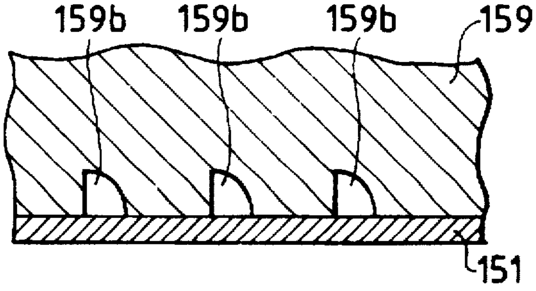
FIG. 16 is a view showing a cross section of the ink-flow channel fabricated in the comparative example.

In this second mold 158, the molten resin flows substantially in normal direction with respect to each ink flow channel portion 156*b*, i.e., with respect to the flow direction of ink in the ink flow channel as completed. As a result, each ink flow channel portion 156*b* is forced to flow from the end upstream of the resin flow, owing to the resin, so that the shape of each residual ink flow channel is made asymmetric with respect to the flow direction of ink. Accordingly, the cross-sectional shape of each ink flow channel 159*b* is rendered asymmetric with respect to the flow direction of ink, as shown in FIG. 16.

A further desirable example was shown as the molding method of the ink jet recording head, but this example is not limited to such a form, but it will be understood that this example can be applied to the mold in which a plurality of pieces are molded at a time.

Figure 17:
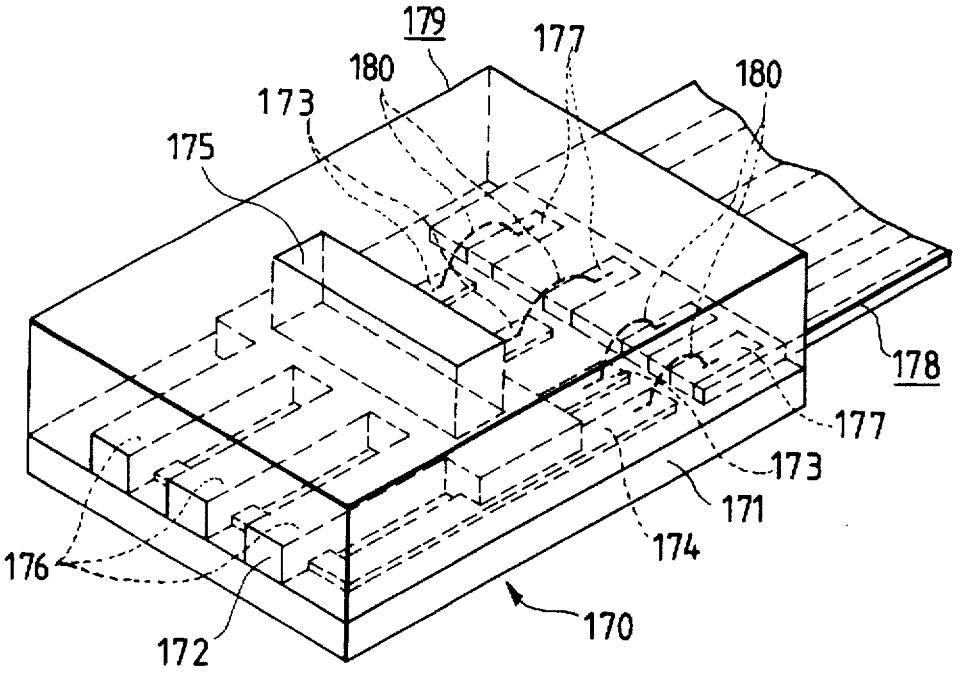
FIG. 17 is a view showing another constitution of an ink jet recording head.

Though the ink jet recording head comprises an electrical connecting portion to transfer an electrical signal for driving the heating element from an apparatus main body to the substrate side, there will be described an example in which the connecting portion is also covered with the structural member at the molding. In FIG. 17, the electrical connecting member 178 for transferring an electrical signal from the recording apparatus main body to the ink jet recording head 170 is composed of a flexible print circuit board in this example, having its one end provided with a bonding pad 177 and the other end connected to the recording apparatus main body, not shown, and further provided with a wiring pattern for connecting the bonding pad 177 to the recording apparatus main body. Each bonding pad 177 is electrically connected to each electrode 173 and the common electrode 174 by the wire bonding using a bonding wire 180. Further, the electrical connecting member 178 is sealed at the one end by the liquid channel constituting member 179. As a result, each bonding wire 180 is placed in a state of being embedded into the liquid channel constituting member 179, and the portion of each electrode 173 and the common electrode where the wire bonding is made, and the bonding pad 177 are covered with the liquid channel constituting member 179, without being in contact with the atmosphere. That is, the electrical connecting portion between the ink jet recording head and the electrical connecting member 178 is being included within the liquid channel constituting member 179. Here, the electrical connecting portion is an essentially necessary portion in making the electrical connection, or a portion which is not covered for insulation at least in the connecting operation, which corresponds to the wire bonding regions of each electrode 173 and the common electrode 174, the bonding wire 180, and the bonding pad 177.

Next, the ink jet recording head 170 will be described in connection with the manufacturing method according to the present invention for each step in series.

Figure 18:
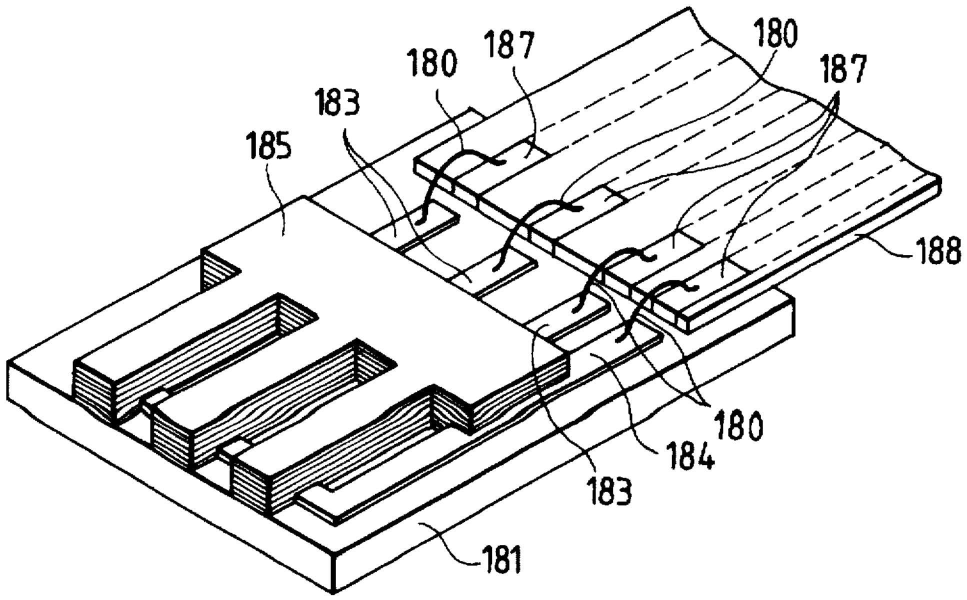
FIG. 18 is a view showing the manufacturing process of an ink jet recording head.

As shown in FIG. 18, the electrical connection is made between the substrate 181 provided with the element and the solid layer 185 created in the same way as in the previous example and the electrical connecting member 2. First, each bonding pad 187 provided at one end of the electrical connecting member 188 is connected to each electrode 183 and the common electrode 184 by means of the bonding wire 180, with a known wire bonding technique, so that the relative positional relation between the electrical connecting member 188 and the substrate 181 may not be changed. In this example, a flexible print circuit plate (FPC) is used as the electrical connecting member 21, but there are provided the electrical connecting member 21 and its connecting method such as 1) Making the wire bonding using the print circuit substrate (PCB), 2) Making the wire bonding using the substrate on which elements having the electrical signal control feature are premounted (commonly referred to as HIC substrate), 3) Connecting the electrode 183 and the common electrode 184 to the element having the electrical signal control feature and provided as the junction, and further connecting the flexible print circuit plate or the print circuit substrate to the junction element with the wire bonding, 4) Making the connection using a lead frame with the wiring bonding, 5) Using a flat cable, and directly connecting its leading end portion to the electrode 183 and the common electrode 184 with the bonding, 6) Making the connection with the flip chip and TAB technique.

Beside these, any method of permitting the electrical connection can be adopted. Essentially, any method can be used as long as it can perform the electrical control and accomplish the feature of driving the ink jet recording head.

Figure 19:
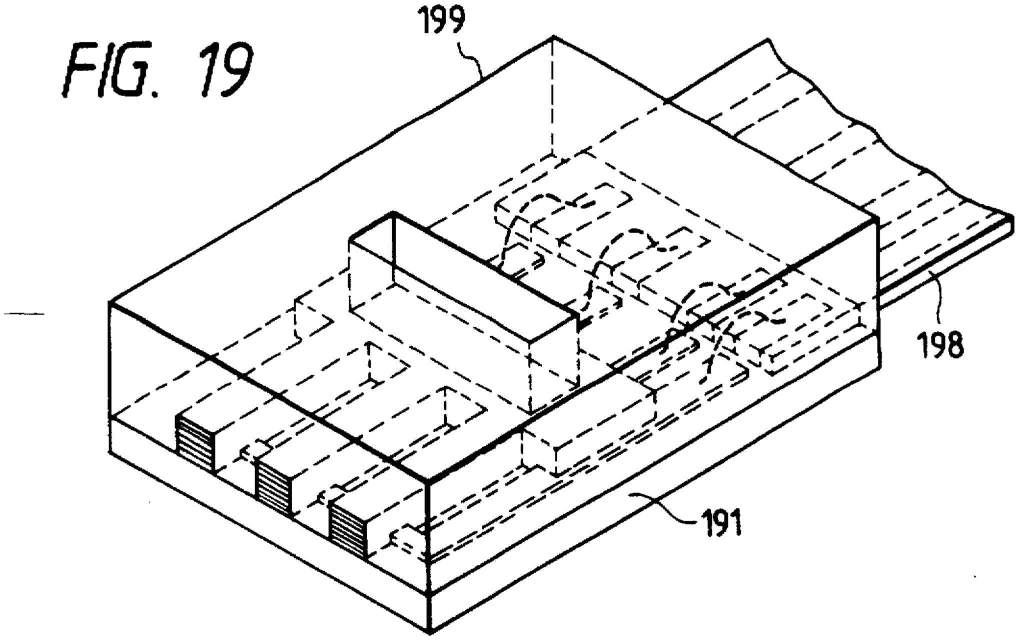
FIG. 19 is a view showing the manufacturing process of an ink jet recording head.

Next, as shown in FIG. 19, the liquid channel constituting member 199 is formed on the substrate 191. At this time, the electrical control portion between the electrical connecting member 198 and the ink jet recording head is placed in a state of being included within the liquid channel constituting member 199. In this example, the liquid channel constituting member 199 is fused and formed on the substrate 3 with the insert molding of the transfer molding, using a mold as described thereinafter and a thermosetting epoxy resin in a condition with a temperature of about 100° to 180°0 C. and a curing time of 1 to 10 min.

The liquid channel forming member 199 of the same material as in the previous example can be used.

After releasing the mold, the solid layer 10 is removed. The removal method can be fulfilled with the previous method.

By performing the manufacturing method as above described, the ink jet recording head 170 as shown in FIG. 17 can be fabricated.

Next, the mold for the transfer molding for use with the manufacture of the ink jet recording head will be described.

Figure 20:
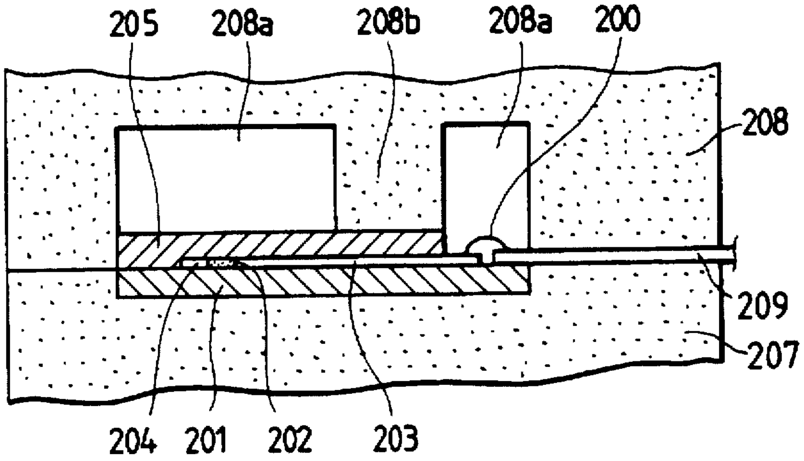
FIG. 20 is a view showing the manufacturing process of an ink jet recording head.

FIG. 20 is a longitudinal cross-sectional view in a state of mounting the substrate 181 connected to the electrical connecting member 188 on the mold. This mold is composed of a lower mold 207 and an upper mold 208, allowing for the mold clamping and the mold opening in upper or lower direction as shown. The lower mold 207 is formed with a recess portion having the same shape as the substrate 201 which can be fitted into the recess portion. As a result, a surface of the substrate 201 on a portion where the solid layer 205, the electricity-heat converter 202, the electrode 203 and the common electrode 204 are not provided can constitute the same plane as the surface on a portion except for the recess portion of the lower mold 207. As the lower mold 207, a normal metallic mold can be used.

On the other hand, the upper mold 208 is provided with a cavity portion 208*a* corresponding to the recess portion of the lower mold 207, and further, a wide groove portion engaged by the electrical connecting member 209 is provided to communicate the cavity portion 208*a* to the outside of the upper mold 208. As a result, the electrical connecting member 209 has its one end placed inside of the cavity portion 208*a*, and the other end placed outside of the mold, and is secured to the upper mold 208 and the lower mold 207, without clearance. Also, the cavity portion 208*a* is provided with a protruding portion 208*b* corresponding to the liquid chamber, with the leading end of the protruding portion 208*b* brought into contact with the solid layer 205 on a region corresponding to a lower end portion of the liquid chamber. For the upper mold 208, a normal metallic mold can be used as for the lower mold 207, but as there is a fear that a part of the surface of the solid layer 205 may melt into the molding material at the molding, the leading end portion of the protruding portion 34 should be constituted of a soft material such as silicon rubber, fluororubber or polytetrafluoroethylene so that the molding material may not be introduced between the solid layer 205 and the protruding portion 268*b*.

The substrate 201 connected to the electrical connecting member 209 is fitted into the recess portion of the lower mold 207, the lower mold 207 and the upper mold 208 are clamped, the molding material is poured from a pot, not shown, through a runner (not shown) provided on the upper mold 208 into the cavity portion 208*a*, and cured, so that the liquid channel constituting member 199 is formed on the substrate 191, and taken out by opening the mold. Note that the electrical connecting portion between the ink jet recording head as above described and the electrical connecting member 198 is wholly positioned inside of the cavity portion 208*a* when the mold is opened, so that this electrical connecting portion is completely placed in a state of being included within the liquid channel constituting member 199. As there is the solid layer 205 on a portion to be used as the liquid channel 176, and the solid layer 205 and the protruding portion 208*a* on a portion to be used as the liquid chamber 175, the molding material may not be entered into these portions, so that the liquid channel constituting member 199 can integrally form the discharge port 172, the liquid channel 176 and the liquid chamber 175.

As above, the example of integrally forming the electrical connecting portion was described, but this example can be varied in many ways.

In the above example, the solid layer 205 is laminated on a portion to be used as the lower end portion of the liquid chamber 175, but if the solid layer of portion to be used as the liquid channel 176 can be placed into contact with the protruding portion 208*b* of the upper mold 208 at the mold clamping, the solid layer on a portion to be used as the lower end portion of the liquid chamber 175 becomes unnecessary. In this case, as the protruding portion 208*b* is directly brought into contact with the substrate 201, it is necessary not to apply an excess force on the substrate 201. Also, it is necessary to prevent a gap from being created between the protruding portion 208*b* and the substrate 201, and between the protruding portion and an end portion of the solid layer, and to prevent the molding material from entering therein, whereby it is desirable that the surface of the protruding portion 34 should be made of a soft material such as silicon rubber, fluororubber or polytetrafluoroethylene.

Also, in the above example, the ink jet recording head 170 is directly fabricated by forming the discharge port 172 and the liquid channel 176, with the transfer molding, but to improve the precision of discharging, it is conceived that the liquid channel constituting member 179 is cut off together with the substrate 171 at a portion corresponding to the neighborhood of the leading end of the liquid channel 176, as previously described, the cut face is polished and used as the new discharge port. In this case, when the solid layer is laminated, it is not necessary to provide the solid layer corresponding to the liquid channel up to the end portion of the substrate 171. It is sufficient if the solid layer further extends toward the end portion of the substrate 171 by the distance of a cut width beyond a destined cut position. Also, if the cutting or polishing is made before removing the solid layer, advantageously, the cutting or polishing dust may not enter the interior of the liquid channel.

In this example, the protruding portion 208*b* provided on the upper mold 208 is used to form the liquid chamber 175, but instead of providing the protruding portion 208*b*, the solid layer can be provided on a whole portion to be used as the liquid chamber 175 to form the liquid channel constituting member, so that by removing the solid layer, the liquid chamber 175 can be formed. Also, instead of the transfer molding, well known means such as curtain coat, roll coat or spray coat can be used.

Next, there will be described an example in which the previous example of fabricating two ink jet recording heads at a time is applied to this example.

As in the previous example, the electrical connecting member 209 is connected to each electrode 203 and the common electrode 204 with the wire bonding, and further, the structural member corresponding to an integral liquid channel constituting member of two ink jet recording heads is formed with the transfer molding. Afterwards, it is cut off at a plane perpendicular to the substrate 201 as the cutting plane. As a result, since the portion to be used as the liquid channel of both ink jet recording heads are continuously provided in straight line, the discharge port can appear on the cutting face, whereby two liquid channel constituting members are formed. Then, if the cutting face is polished, and the solid layer 205 is removed, two ink jet recording heads can be obtained at a time as in the previous example.

Next, the mold for use with the transfer molding as above will be described.

Figure 21:
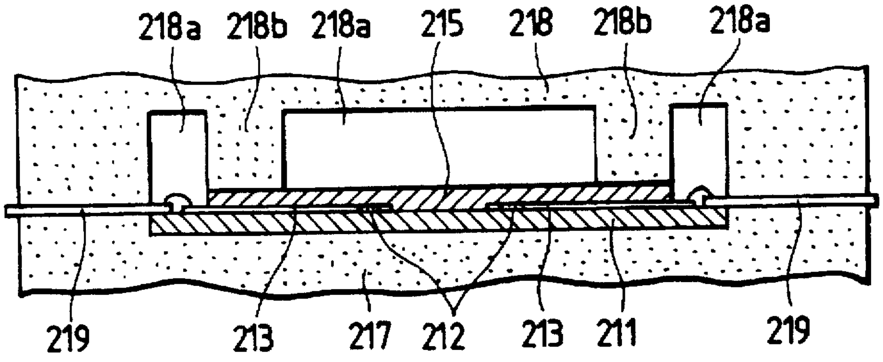
FIG. 21 is a typical cross-sectional view of a mold useful in this example.

FIG. 21 is a cross-sectional view in a state where the substrate 211 connected to the electrical connecting member 21 is mounted on this mold.

The lower mold 217 has a recess portion thereof into which the substrate 211 is fitted, and the upper mold 218 has a wide groove portion for introducing the electrical connecting member 219 from the outside, as in the first example. This groove portion corresponds to two ink jet recording heads formed opposingly, and is provided on both sides of the upper mold as shown. Further, the upper mold 218 is provided with a cavity portion 218*a* corresponding to the recess portion of the lower mold 217. Two protruding portions 218*b* are provided on the cavity portion 218*a*, corresponding to respective liquid chambers of two ink jet recording heads. The leading end of the protruding portion 218*b* is placed into contact with the solid layer 215, as in the previous example, and the electrical connecting portion between the ink jet recording head and the electrical connecting member 219 is totally placed within the cavity portion 218*a*. In this state, by pouring the molding material through a pot and a runner, not shown, into the cavity portion 218*a*, the structural member integral with the liquid channel constituting member of two ink jet recording heads can be formed on the substrate 3 collectively.

Next, there will be described an example in which the example as shown in FIGS. 6A and 6B is applied to form further more ink jet recording heads at a time.

Figure 22A:
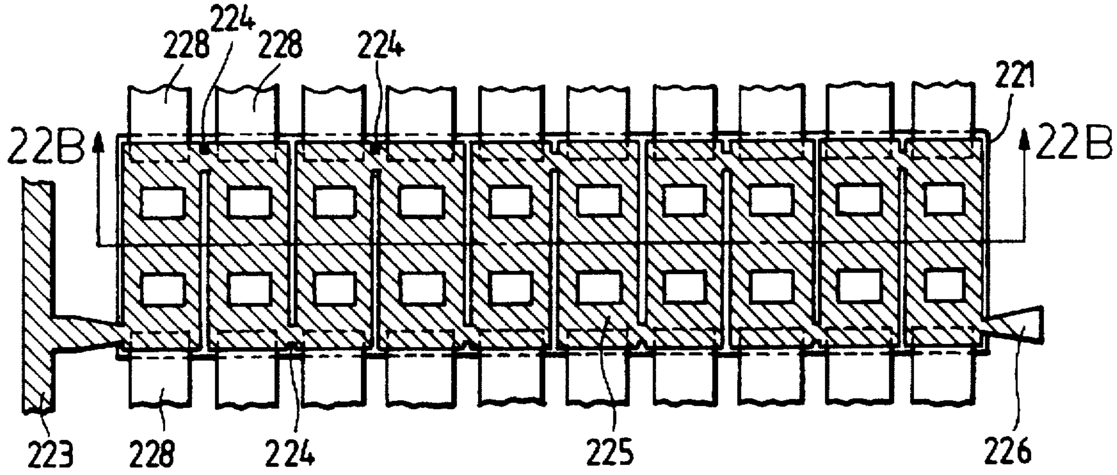

FIG. 22A is an explanation view showing the flow of molding material with the transfer molding, in this example, wherein a dot-and-dash line indicates a cutting prescribed line useful in separating a collectively fabricated product into each product.

With two ink jet recording heads opposed as a pair as shown in-previous example, and by arranging a multiplicity of these pairs in a longitudinal direction of the strip-like substrate 221, as previously described, the structural member 225 corresponding to an integral form of liquid channel constituting members opposingly arranged can be formed collectively for all the pairs. Then, the cutting face for each pair, i.e., the cutting face in dividing one pair into two ink jet recording heads, lies on the same plane. In this way, electrical connecting members 228 can be arranged orderly from both long edges of the strip-like substrate 221 outward. In the following, the manufacturing method in this example will be described in due order.

First, the electricity-heat converter, the electrode and the common electrode are formed on the strip-like substrate 221, corresponding to the number of recording heads, as previously described, and further, the solid layer is formed. As a result, the shape in which a multiplicity of members are arranged as in the previous example can be obtained. Afterwards, the electrical connecting member 228 is connected to respective electrodes and the common electrode, and the structural member 225 is collectively formed with the transfer molding, using a mold as described hereinafter, and divided into each piece, so that by removing the solid layer, a plurality of ink jet recording heads can be obtained.

The same method of removing the solid layer as in the previous example can be used.

Here, a mold for use with this fabrication will be described.

Figure 22B:
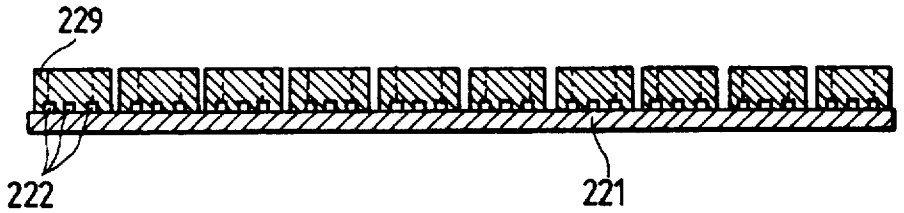

The lower mold has a recess portion into which the strip-like substrate 211 is fitted, as in the first and second examples. The upper mold has a shape in which upper molds 218 (FIG. 21) in the second example are concatenated in multiplicity via the runner. That is, the cavity portions for forming the structural member corresponding to integral liquid channel constituting member of two ink jet recording heads opposed are concatenated via the runner 224. This cavity portion is the same as the cavity portion 218*b* shown in FIG. 21. In this case, the cavity portion on the most upstream side (on the side closest to a pot, not shown) is connected to a main runner 224 communicating from the pot, while the cavity portion on the most downstream side is provided with an air bleeder 226. The runner 224 connecting between adjacent cavity portions is arranged side by side, whereby the molding material flows into each cavity portion fully, thereby allowing an excellent molding. FIG. 22B indicates a cross section where after curing the molding material, the moldings integral with the substrate 42 are taken out, and cut off along the line B—B of FIG. 22A. In the cross section, the discharge port 222 appears, and it is seen that the liquid channel constituting member 229 was formed.

While in each example as above described, one end of the electrical connecting member is made in contact with the substrate, the present invention is not limited to such a form, but the electrical connecting member can be arranged in any form as long as the electrical connecting portion can be included with the liquid channel constituting member. This example was described concerning the connecting portion of the ink jet substrate as the example, but it is not limited to such a portion, and can be applied to the connecting portion of other elements. In this ink jet substrate, great effects can be obtained due to its improved thermal conductivity.

The above example was described mainly in connection with the example of fabricating the ink jet recording head, the transfer molding of the present invention can be applied to the instance of forming other members. The example will be shown in the following. As in the case of the ink jet, the solid layer 235 is provided on the substrate (as previously described) on which elements are disposed.

The positional accuracy of the solid layer 235 with respect to the substrate 231 is equivalent to that of the undercut portion 233 with respect to the substrate 1. When various elements are formed on the substrate 231 and made to correspond to the undercut portion 233, it is desirable to form the solid layer 235 using the photolithography because a high positional accuracy is required.

Figure 23A:
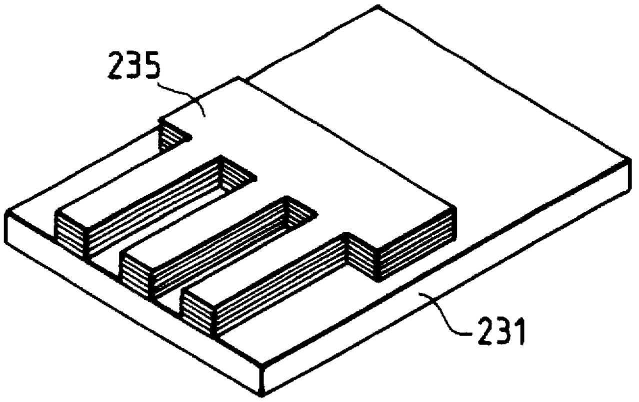
FIGS. 23A to 23C views showing one example of the forming method of the molded member, respectively.
Figure 23B:
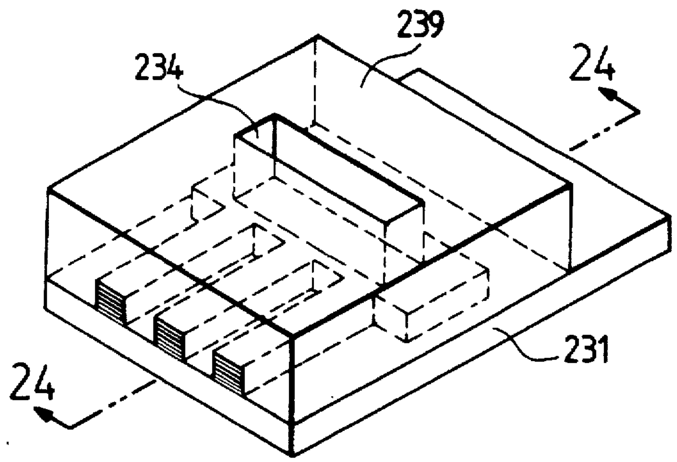
Figure 23C:
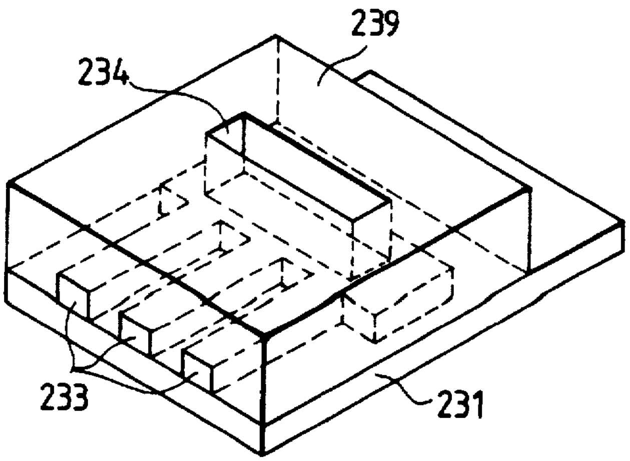

Next, the molded member 239 is integrally formed by fusing it on the substrate 231 while at the same time being molded with the insert molding of the transfer molding, as shown in FIG. 23B. Then, as the protruding portion 14 (FIG. 2) corresponding to the opening portion 234 is provided in the mold, as will be described, the opening portion 234 is formed, thereby allowing the solid layer 235 provided corresponding at its lower end portion to be seen, as viewed from an upper side of the opening portion 234.

Here, if the opening portion 234 is not provided, the removal of the solid layer 235 can be performed only from the leading end portion of the undercut portion 233, thereby causing a great trouble.

Also, as the burr or clogging may occur at the leading end portion of the undercut portion 233 at the transfer molding, it is conceived that by making the undercut portion 233 in a longer size, the leading end portion of the undercut portion 233 is polished, or the unnecessary portion is cut. In these cases, by removing the solid layer 235 after polishing or cutting, the polishing or cutting dust can be prevented from entering the undercut portion 233.

Next, a mold for use with the transfer molding will be described.

Figure 24:
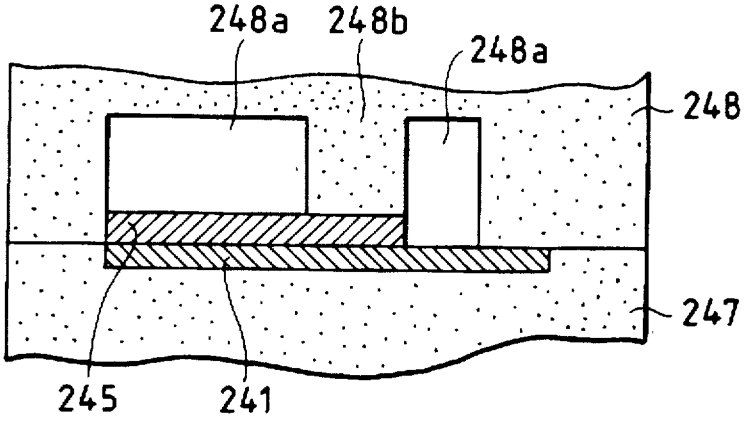
FIG. 24 is a cross-sectional view of a mold useful in this example.

FIG. 24 is a cross-sectional view in a state where the substrate 1 having the solid layer formed completely is mounted on the mold and clamped, and corresponding to a cross section taken along the line 24—24 in FIG. 23B.

The upper mold 248 and the lower mold 247 are sufficient if they are provided with the feature of the mold used in the example of the ink jet. Also, a contact portion of the discharge portion 248*b* with the substrate is configured to conform to the example of the ink jet (such as providing a soft member) as previously described. If the molding material is poured from the runner (not shown) into the cavity portion 248*a* of such mold, the molding material is filled in a space surrounded by the substrate 241, the solid layer 245, an inner wall of the cavity portion 248*a*, and a side face of the protruding portion 248*b*, and then cured, resulting in a molded member 239. That is, the substrate 241 and the solid layer 245 substantially serve as the lower mold. As will be described later, when multiple products are fabricated at a time by the use of a large substrate, the molding can be made in such a way as to use the substrate itself as the lower mold, that is, to place the upper mold only into contact with the substrate with the parting line interposed at the mold clamping.

Also, when the substrate 241 is a semiconductor substrate, and various elements are integrated on its surface, it is desirable to constitute the surface of at least a recess portion of the lower mold 247 of a soft material, because undue force must be kept from being exerted on the substrate.

As the positional accuracy of the undercut portion 233 with respect to the substrate 231 can be made quite higher by the use of the photolithography, as above described, it is possible to use the semiconductor substrate as the substrate 231, and form various elements on the substrate 231 in correspondence with the undercut portion 233. In this case, as the semiconductor manufacturing process is used as a process of manufacturing those elements, there is an advantage that the formation of the solid layer 235 can be made easily with the photolithography.

The ink jet recording head having the electricity-heat converter arranged on the silicon substrate was exemplified previously. Also, by forming an ion selective field effect transistor (ISFET) or the like on the substrate 1 in correspondence with the undercut portion 233, various sensors can be easily fabricated. Note that the arrangement of a sensor element on the undercut portion 233 is favorable because the effects of the light incident upon the sensor element can be prevented.

As the lower mold is substantially the substrate 231 at the molding, as above described, the entire substrate can be pressed with a uniform pressure at the molding, if the soft member is made in contact with the whole surface on the back side (the side where the molded member 239 is not formed), and the leading end portion of the protruding portion 248 in the upper mold 248 is made of a soft material. And the molding method is the transfer molding, and the molding pressure is not very great, so that even if various elements, e.g., semiconductor devices, are integrated on the substrate 231 at a place immediately below the opening portion 234, these elements are not subjected to the breakage or bad effect. That is, even if a memory cell or light receiving element is formed on the substrate 231 corresponding to the opening portion 234, using a semiconductor substrate as the substrate 231, these elements are not subjected to damage at the molding, so that the present invention can be also applied to the manufacture of semiconductor devices requiring a window portion toward the outside.

Further, if various elements are formed on the substrate 1 in correspondence with both the undercut portion 233 and the opening portion 234, it is possible to manufacture various composite elements or composite sensors.

Next, as shown in FIG. 8 with the example of the ink jet, there will be described an example in which the solid layer is formed only on a portion corresponding to the undercut portion 233.

Figure 25:
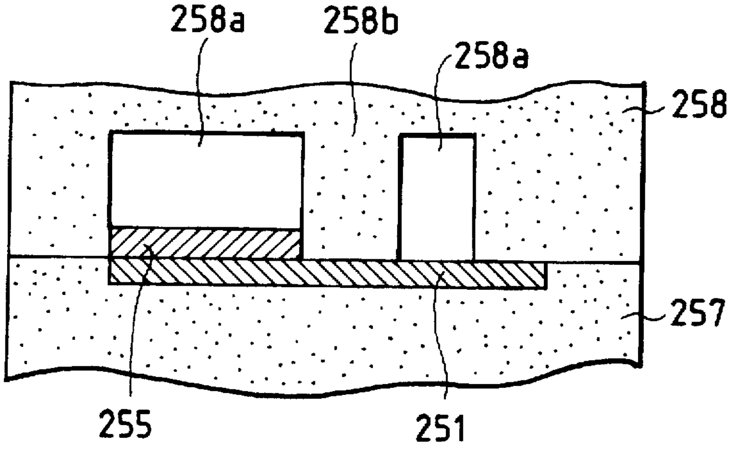
FIG. 25 is a cross-sectional view of another mold useful in this example.

FIG. 25 is a cross-sectional view showing a mold for use in the second example according to the present invention, having the same functional constitution except that the substrate is not an ink jet substrate, and the leading end portion of the protruding portion is directly brought into contact with the substrate 251 at the mold clamping. In this case, in order to prevent the molding material from entering a portion where the solid layer 255 corresponding to the undercut portion 233 is in contact with the protruding portion 258*b*, the leading end portion of the protruding portion 258*b* is preferably made of a soft material as previously described. Also, the solid layer 255 can be formed to extend slightly further to the side of the protruding portion 258*b* of the upper mold 258, so that an end portion of the solid layer 255 and the leading end portion of the protruding portion 258*b* are easily placed closely in contact, and the molding material is prevented from entering a contact portion between the solid layer 255 and the protruding portion 258*b*.

The next example is such that in fabricating a product having the undercut portion provided only in one direction relative to the opening portion, two products are fabricated (two impressions) at a time, as in the previous recording head, by arranging final products opposed with the continuous undercut portion interposed, wherein two products are fabricated with its undercut portion arranged continuously and opposed.

Figure 26A:
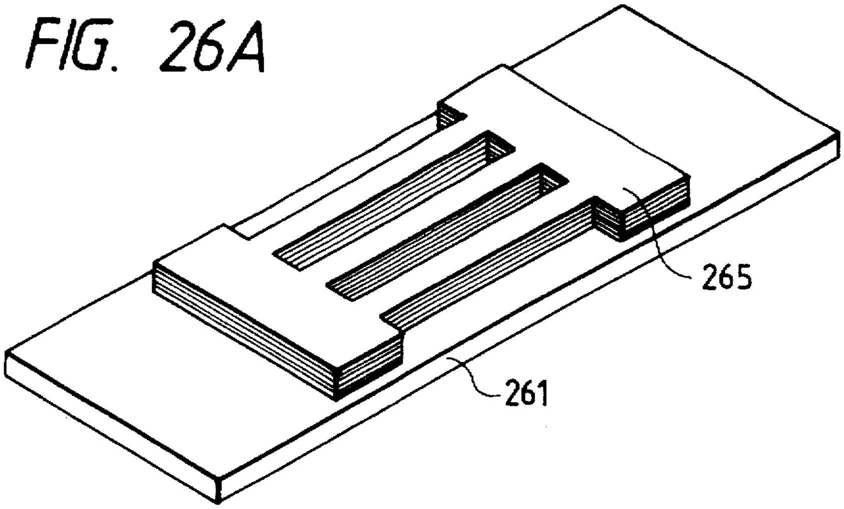
FIGS. 26A and 26B views showing another example of the forming method of the molded member, respectively.
Figure 26B:
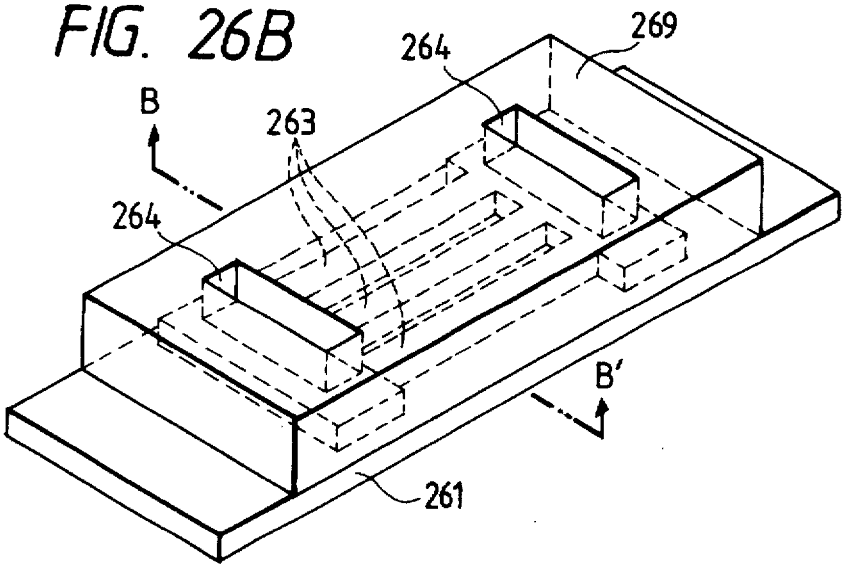

FIGS. 26A and 26B are explanation views showing the processes of another example according to the present invention, respectively.

First, the solid layer 265 is formed on the substrate 261 having elements disposed, as shown in FIG. 26A and 26B. The substrate 261 is of a shape corresponding to two products with its undercut portion arranged continuously and opposed. The solid layer 265 consists of positions corresponding to respective lower end portions of the opening portion 264 in both products, and linear portions connecting both lower end portions, because the undercut portion of two products are continuously connected. This linear portion can correspond to the continuous undercut portion 263 of both products. The material of the solid layer 265 and its forming method are the same as in the previous example of the ink jet head.

Next, a collective molded member 269 is formed on the substrate 21, with the insert molding of the transfer molding, using a mold as described thereinafter, and then cut off along the line B—B', so that by removing the solid layer 265, two products can be obtained, in which the molded member having the undercut portion provided at an interface portion with the substrate and the opening portion communicating to this undercut portion is formed on the substrate. In this case, an opening at the leading end of the undercut portion only appears by cutting as above described, so that it is not necessary to apprehend the creation of burrs at the leading end portion or clogging on the undercut portion. Note that the process for removing the solid layer 22 before cutting is possible, in which as the cutting dust is easily entered into the undercut portion, it is desirable to remove the solid layer 22 after cutting.

Figure 27:
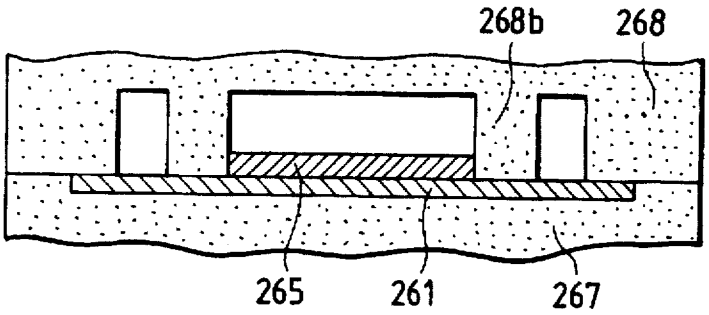
FIG. 27 is a cross-sectional view showing one example of a mold useful in this example.

The mold for use with the transfer molding as above described is required to have the same constitution and function as the mold shown in FIG. 5C. Also, when two molding members are fabricated at a time, the solid layer can be provided only on a portion corresponding to the undercut portion (FIG. 27). Note that the detailed constitution and effects are the same as previously described.

When the thickness of the substrate 261 is sufficiently thin, it is not necessary to provide a recess portion on the lower mold, by making up an upper face of the lower mold with a soft material over a larger area than the dimension of the substrate 261. This is because the substrate 261 is pressed against the soft member at the mold clamping, and substantially fitted into the recess portion. Such a way of providing the soft member can be of course used when the ink jet head is molded or in a method as will be described later. In addition to the ink jet head, multiple semiconductor devices can be also formed similarly, as shown in FIG. 7. As to the mold for use with such a multiple impression, the explanation will be given using FIG. 7.

The upper mold is such that four upper molds for the striplike substrate as shown in the previous example are provided in parallel, the cavity portion on the most upstream side is connected to the main runner for each line, the intervals between adjacent cavity portions are connected by the runner 78 arranged side by side, and the cavity portion on the most downstream side is provided with the air bleeder 80. The main runner 77 serves to supply the liquid molding material from the pot, not shown, into each cavity portion. As a result, the molding material supplied from the pot can be extended into each cavity portion fully, thereby allowing the manufacture of good products.

On the other hand, the lower mold is not particularly designated. As described in the previous example, the substrate substantially serves as the lower mold in the present invention, and particularly, when the multi-impression is performed using a large substrate as in this example, the peripheral portion of the substrate is not used for the product, and this peripheral portion is always brought into contact with the upper mold at the mold clamping. The lower mold can be provided with a recess portion of the same shape as the substrate 77, for example, or its upper face may be planar. Note that the soft member should be disposed on a portion in contact with a back face of the substrate in the lower mold.

As a further constitution of the mold, it is possible to have a sprue or pot on the upper mold to be located upward of the substrate. In this case, all the runners are provided only within an area in contact with the substrate of the upper mold, more clearly exhibiting the property of the substrate itself as the lower mold.

While in the above explanation of the example, the substrate 71 was described as a substantially circular substrate of silicone, the substrate is not limited to this. It can be appropriately selected depending on the usage of product to be fabricated, and its manufacturing process.

In the above example, the shape of the undercut portion can be arbitrarily taken depending on the shape of the solid layer, for example, the molded member having a flexed undercut portion, a meshed undercut portion, or an undercut portion having different diameter portion intermediately can be formed on the substrate.

Next, the first example of the ink jet recording apparatus will be described.

Figure 28:
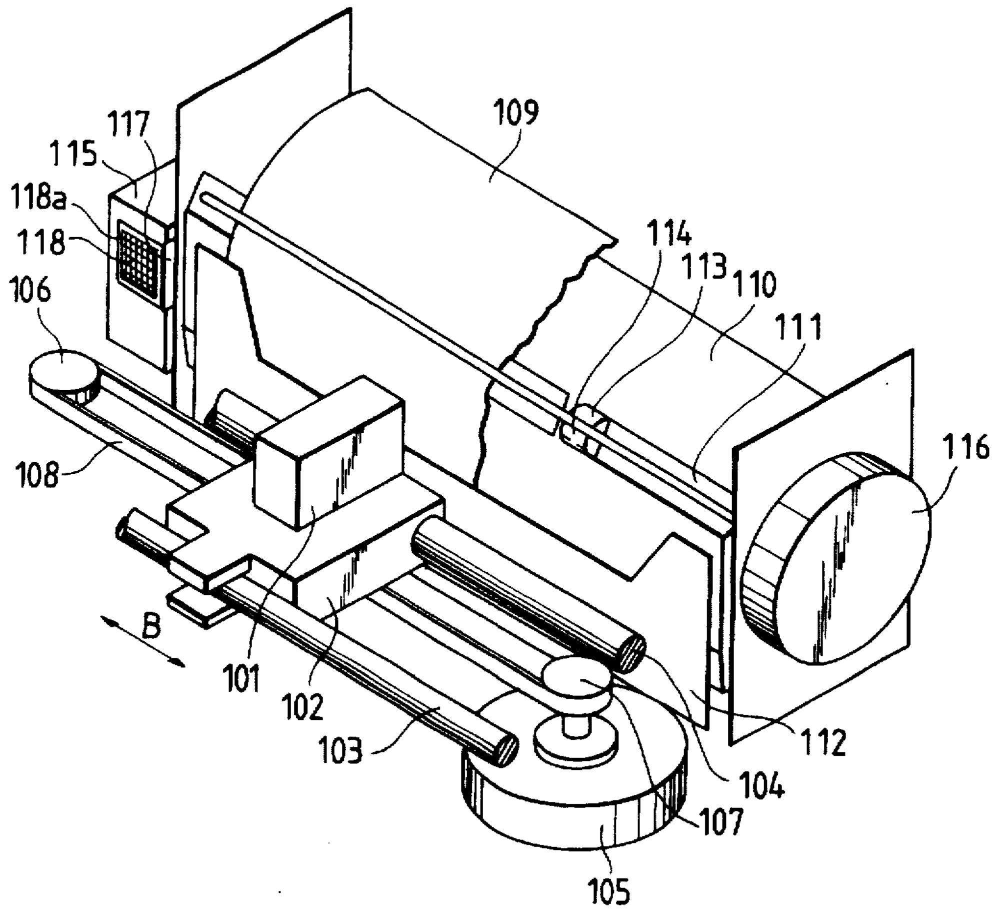
FIG. 28 is a typical perspective view of an ink jet recording apparatus according to the present invention.

In FIG. 28, a recording head 101 for recording a desired image by discharging the ink in accordance with a predetermined recording signal has the same constitution as that shown in the first and second examples of the previously shown recording head, and was fabricated with any one method in the first to sixth examples of the manufacturing method of the recording head as previously described.

A carriage 102 having the recording head 101 mounted therein is fitted between two guide shafts 103, 104 so as to be freely slidable in a direction of the arrow B, and connected with a part of a timing belt 108 which is looped around a pulley 107 secured to an output shaft of a carriage motor 105 and a pulley 106 supported freely rotatably around its axis. The recording head 101 is constituted to reciprocate in a direction of the arrow B when the timing belt 108 is rotated in normal or reverse direction by the pulley 107 rotating in normal or reverse direction with the driving force of the carriage motor 105.

A recording sheet 109, which is a recording medium, is guided by a paper pan 110, and conveyed by a paper feed roller, not shown, which is pressed by a pinch roller. This conveyance is performed by a paper feed motor 116 as the driving source. The conveyed recording paper 109 is subjected to a tension applied by a paper exhausting roller 113 and a spur 114, and pressed against a heater 111 by a paper presser bar 112, so that it is conveyed to be closely in contact with the heater. The recording paper 109 having the ink sprayed by the recording head 101 is heated by the heater 111, and the ink deposited is fixed onto the recording paper 109 with its water content evaporated.

A recovery unit 115 is to maintain the discharge characteristics in a normal condition by removing foreign matters adhering to the discharge port of the recording head 101, not shown, or thickened ink.

The recovery unit 115 is provided with a cap 118*a* for capping the discharge port of the recording head 101, and preventing the clogging from occurring. An ink absorbing member 118 is disposed within the cap 118*a*.

Also, on the recording area side of the recovery unit 115 is provided a cleaning blade 117 for cleaning foreign matters of ink droplets adhering to a face having the discharge port formed therein by making in contact with the face where the discharge port of recording head is formed.

Next, the second example of the ink jet recording head will be described.

Figure 29:
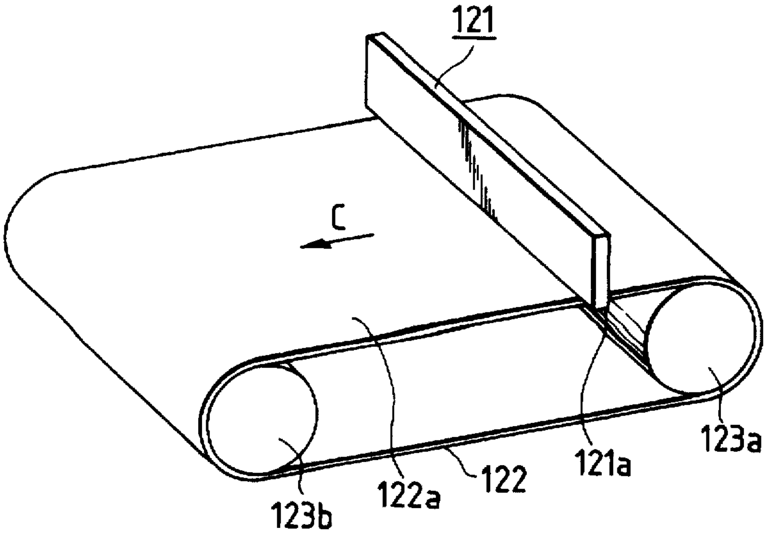
FIG. 29 is a typical perspective view of another ink jet recording apparatus according to the present invention.

FIG. 29 is a schematic perspective view showing the essential parts of the ink jet recording apparatus. The recording head 121 for recording a desired image by discharging the ink based on a predetermined recording signal is a full-line type having the same constitution as the recording head in the previous first and second examples, and was manufactured with the method in the first, second or third example, or the sixth example corresponding to each example.

The recording head 121 is mounted on the ink jet recording apparatus main body, wherein the discharge port face 121*a* having a plurality of discharge ports arranged in a column is spaced away by a predetermined distance from a conveyance face 122*a* of a conveying belt 122.

The conveying belt 122 is looped around two rollers 123*a*, 123*b* supported freely rotatably by the recording apparatus main body, and moved in a direction of the arrow C when at least one roller is forced to be rotated.

The recording apparatus in this example is constituted to record in such a manner that the recording medium fed from a paper feed section (the right side in the figure), not shown, to the conveying belt 122 is closely attached onto a conveyance surface 122*a* of the conveying belt 122 and passed through a gap between the discharge port face 121*a* of the recording head 121 and the conveyance face 122*a*, while the ink is being discharged from each discharge port of the recording head 121.

The present invention can exhibit the following effects owing to its above specified constitution.

In an ink jet recording head and the manufacturing method of the ink jet recording head, according to the present invention, the ink jet recording head is of a simple structure consisting of a substrate and a structural member fused on the substrate while at the same time being molded with the transfer molding, and there is less risk that the bonded face is peeled off, as compared with a conventional laminate of three or more layers, so that the reliable recording head having a sufficient mechanical strength can be obtained.

The registration of the liquid channel with respect to the energy generating element formed as the film on the substrate is performed when the solid layer is formed on the substrate, and the positional accuracy can be higher without the need of a complex and expensive instrument for pasting the minute energy element of the first substrate with the minute liquid channel of the second substrate in precise registration, as required conventionally, resulting in a superior mass productivity and a reduced manufacturing cost.

As the structural member for making up the discharge port, the liquid channel, and the liquid chamber is fused onto an element surface of the substrate while at the same time being molded, with the transfer molding, a process of providing the structural member according to the present invention is shorter in time than conventional complex and trouble process of providing the structural member by leaving it away for a long time with the application of a curable material mixed with the curing agent, as found in a conventional manufacturing method, or illuminating it with the activation energy line with the coating of an activation energy line curable material, and further, a supply port can be formed while the structural member is being molded. Accordingly, the manufacturing cost can be reduced.

Also, particularly, by making a face of one mold holding the substrate in contact with the substrate from a soft member, the force applied on the substrate at the molding becomes uniform, thereby avoiding the fracture of the substrate or the breakage of energy generating element, so that there is an effect that a thin substrate can be used, and the improvement of yield and the reduction of cost can be achieved.

Particularly, the structural member for an integral liquid channel constituting member corresponding to two ink jet recording heads opposed is formed, and then cut off, so that the mass productivity can be further increased, and as the discharge port is only formed by cutting, there is an advantage that the shape accuracy of the discharge port is excellent, thereby producing the ink jet recording head of high quality.

Also, the electrical connecting portion is formed in a relatively early process of its fabrication, and is placed in a state of being included within the liquid channel constituting member, so that the electrode or the surface of electrical connecting member is not subjected to corrosion or damage, and the early evaluation of electrical characteristics is allowed, thereby having the effects of providing the reliable electrical connection of high quality, and allowing the early detection of failure if any.

Further, by making the flow direction of resin in molding the resin substantially the same as that of ink in the ink flow channel, the shape of the ink flow channel can be made substantially in symmetry with respect to the flow direction of ink. As a result, the discharge ink may not be scattered or made oblate, enabling the recording of clear image.

As the molding resin may flow in the same direction as the minute ink flow channel, bubbles produced within the resin at the molding can easily disappear, so that any failure due to bubbles will not occur in the flow channel portion.

Further, as above described, the present invention has the effects that by making the solid layer and the molding synthetic resin incompatible and making the thermosoftening temperature of the molding synthetic resin lower than that of the solid layer, the ink flow channel in the ink jet recording head to be fabricated will not be deformed, and highly reliable ink jet recording heads each having a large liquid chamber can be manufactured cheaply in mass production in simple and few processes.

We claim:

1. A method for manufacturing an ink jet head having a discharge port for discharging ink, a liquid chamber for temporarily storing ink to be supplied to said discharge port and a flow path connecting said discharge port with said liquid chamber, said method comprising the steps of:

providing a substrate having an element surface on which is formed an energy generating element for generating energy used to discharge ink from said discharge port;

forming on said substrate a solid layer of a removable material to enable formation of said flow path and said liquid chamber;

positioning said substrate provided with said solid layer in a mold by contacting a part of said mold with a part of said solid layer for forming said liquid chamber;

coating with a resin a surface of said solid layer excluding at least the part of said solid layer which is in contact with said mold and at least a part of said element surface; and forming said flow path and said liquid chamber by taking said substrate out of said mold and removing said solid layer.

2. A method according to claim 1, wherein a portion of said solid layer not coated by said resin includes a part of said surface of said solid layer for forming said flow path and a part of said surface of said solid layer for forming said liquid chamber.

3. A method according to claim 1, wherein said solid layer includes a portion for forming said flow path and a separate portion for forming said liquid chamber.

4. A method according to claim 1, further comprising a step of cutting and removing a part of said solid layer for forming said flow path after said coating step, wherein after said cutting and removing step, said forming step for forming said flow path and said liquid chamber by removing said solid layer is performed.

5. A method according to claim 1, wherein said coating step is performed by flowing said resin in a direction along said solid layer for forming said flow path.

6. A method for manufacturing an ink jet head having a discharge port for discharging ink, a liquid chamber for temporarily storing ink to be supplied to said discharge port and a flow path connecting said discharge port and said liquid chamber, said method comprising the steps of:

providing a substrate having an element surface on which is formed an energy generating element for generating energy used to discharge ink from said discharge port;

forming on said substrate a solid layer of a removable material to enable formation of said flow path and said liquid chamber;

coating with a resin a surface of said solid layer excluding at least a part of said surface and at least a part of said element surface;

forming said flow path and said liquid chamber by removing said solid layer; and connecting said substrate and a circuit board through a bonding wiring, wherein in said coating step at least a part of said bonding wiring is also coated with resin.

7. A method according to claim 6, wherein said solid layer includes a portion for forming said flow path and a separate portion for forming said liquid chamber.

8. A method for manufacturing a plurality of ink jet heads each having a discharge port for discharging ink, a liquid chamber for temporarily storing ink to be supplied to said discharge port and a flow path connecting said discharge port with said liquid chamber, said method comprising the steps of:

providing a substrate having an element surface on which is formed plural energy generating elements corresponding to said plural ink jet heads;.

forming on said substrate a plurality of solid layers corresponding to said plurality of ink jet heads made of a removable material to enable formation of said flow paths and said liquid chambers;

providing a mold, a part of which is in contact with said solid layers;

coating with a resin a surface of said solid layers corresponding to said plural ink jet heads excluding at least a part of said surface and at least a part of said element surface, said mold containing said resin so as to form a suitably-dimensioned said liquid chamber;

separating said solid layer and said substrate coated with said resin into said plurality of ink jet heads; and forming said flow path and said liquid chamber of each said ink jet head by removing said solid layer.

9. A method according to claim 8, wherein said solid layer for two said ink jet heads is integrally formed on said substrate.

10. A method according to claim 8, wherein a portion of said solid layer not coated by said resin includes a part of said surface of said solid layer for forming said flow path and a part of said surface of said solid layer for forming said liquid chamber.

11. A method according to claim 8, wherein said substrate is provided with wiring for electrically connecting said substrate with external circuitry and in said coating step at least a part of said wiring is also coated with the resin.

12. A method according to claim 8, wherein said solid layer includes a portion for forming said flow path and a separate portion for forming said liquid chamber.

13. A method according to claim 8, further comprising a step of cutting and removing a part of said solid layer for forming said flow path after said coating step, wherein after said cutting and removing step, said forming step for forming said flow path and said liquid chamber by removing said solid layer is performed.

14. A method according to claim 8, wherein said coating step is performed by flowing said resin in a direction along said solid layer for forming said flow path.

* * * * *

UNITED STATES PATENT AND TRADEMARK OFFICE

CERTIFICATE OF CORRECTION

PATENT NO. : 5,758,417
DATED : June 2, 1998
INVENTOR(S) : MASATSUNE KOBAYASHI, ET AL.

It is certified that error appears in the above-identified patent and that said Letters Patent is hereby corrected as shown below:

COLUMN 2

Line 16, "61-15497" should read --61-154947--;
Line 37, "radiated" should read --irradiated--; and
Line 45, "62-25347" should read --62-253457--.

COLUMN 6

Line 39, "reocrding" should read --recording--.

COLUMN 7

Line 4, "views" should read --are views--;
Line 10, "views" should read --are views--; and
Line 63, "is entered into" should read --enters--.

COLUMN 8

Line 45, "show" should read --show a--.

COLUMN 10

Line 24, "solid layer 25" should read --solid layer 45--; and
Line 64, "26," should read --45,--.

COLUMN 11

Line 14, "to" should read --with--; and
Line 52, "trouble" should read --troublesome--.

CERTIFICATE OF CORRECTION

PATENT NO. : 5,758,417

DATED : June 2, 1998

INVENTOR(S) : MASATSUNE KOBAYASHI, ET AL.

It is certified that error appears in the above-identified patent and that said Letters Patent is hereby corrected as shown below:

COLUMN 12

Line 53, "unexposure" should read --unexposed--;
Line 57, "26" should read --45-- and "unexposure" should read --unexposed--;
Line 58, "26," should read --45,--;
Line 60, "29" should read --39--; and
Line 67, "4E" should read --4F,--.

COLUMN 13

Line 35, "polished matters" should read --polishing debris--.

COLUMN 15

Line 2, "are" should read --is--; and
Line 27, "adjacent one" should read --the adjacent--.

COLUMN 16

Line 41, "81" (first occurrence) should read --81a--; and
Line 48, "connect" should read --the connecting--.

COLUMN 17

Line 42, "is entered into" should read --enters--; and
Line 55, "taking" should read --having--.

UNITED STATES PATENT AND TRADEMARK OFFICE

CERTIFICATE OF CORRECTION

PATENT NO. : 5,758,417

DATED : June 2, 1998

INVENTOR(S) : MASATSUNE KOBAYASHI, ET AL.

It is certified that error appears in the above-identified patent and that said Letters Patent is hereby corrected as shown below:

COLUMN 20

Line 51, "Beside" should read --Besides--; and
Line 63, "thereinafter" should read --hereinafter--.

COLUMN 21

Line 1, "10" should be deleted; and
Line 61, "may not be entered into" should read --cannot enter--.

COLUMN 23

Line 29, "in-previous" should read --in previous--.

COLUMN 24

Line 14, "made in" should read --brought into--; and
Line 33, "1." should read --231.--.

COLUMN 26

Line 44, "21," should read --261,--; and
Line 45, "thereinafter" should read --hereinafter--.

UNITED STATES PATENT AND TRADEMARK OFFICE

CERTIFICATE OF CORRECTION

PATENT NO. : 5,758,417

DATED : June 2, 1998

INVENTOR(S) : MASATSUNE KOBAYASHI, ET AL.

It is certified that error appears in the above-identified patent and that said Letters Patent is hereby corrected as shown below:

COLUMN 28

Line 20, "matters" should read --matter--;
Line 28, "matters" should read --matter--;
Line 29, "of" should read --or--; and
Line 30, "making in" should read --coming into--.

COLUMN 29

Line 21, "trouble" should read --troublesome--.

Signed and Sealed this

Twenty-third Day of March, 1999

Attest:

Q. TODD DICKINSON

Attesting Officer

*Acting Commissioner of Patents and Trademarks*